(12) United States Patent
Amani

(10) Patent No.: US 11,848,984 B1
(45) Date of Patent: Dec. 19, 2023

(54) SYSTEM FOR PROVIDING REMOTE INTEROPERATION BETWEEN DEVICES

(71) Applicant: Majid Amani, East Greenwich, RI (US)

(72) Inventor: Majid Amani, East Greenwich, RI (US)

(*) Notice: Subject to any disclaimer, the term of this patent is extended or adjusted under 35 U.S.C. 154(b) by 0 days.

(21) Appl. No.: 18/070,379

(22) Filed: Nov. 28, 2022

Related U.S. Application Data

(63) Continuation-in-part of application No. 17/480,122, filed on Sep. 20, 2021, now Pat. No. 11,513,975, which is a continuation-in-part of application No. 16/951,825, filed on Nov. 18, 2020, now Pat. No. 11,126,570.

(60) Provisional application No. 63/194,702, filed on May 28, 2021.

(51) Int. Cl.
*H04L 67/10* (2022.01)
*G06F 9/54* (2006.01)

(52) U.S. Cl.
CPC .............. *H04L 67/10* (2013.01); *G06F 9/541* (2013.01)

(58) Field of Classification Search
CPC ....... H04L 67/10; G06F 9/541; G06K 7/0004; G06K 7/10297; G06K 7/1413
See application file for complete search history.

(56) References Cited

U.S. PATENT DOCUMENTS

| | | | |
|---|---|---|---|
| 2015/0326463 A1* | 11/2015 | Solondz | H04L 43/0829 370/252 |
| 2016/0044566 A1* | 2/2016 | Nammi | H04B 1/715 370/331 |
| 2020/0286368 A1* | 9/2020 | Trupp | G16Y 40/35 |

\* cited by examiner

*Primary Examiner* — Cheikh T Ndiaye
(74) *Attorney, Agent, or Firm* — KENNETH j. LUKACHER LAW GROUP; R. S. Rosenholm

(57) ABSTRACT

The invention provides an alternative applications programming interface (API) for a software application to interface with and to control and coordinate the operation of a variety of specialty devices, including a barcode scanning device and a label printing device. In some embodiments, this alternative API is provided via a software application interface module (SAIM) that is remotely accessible to a software application module (SAM) via a computer network. The SAIM provides for interface and control of specialty devices that would otherwise be un-accessible to a software application module (SAM), via employment of a device specific interface module (DSIM), which functions like a device driver to specialty devices that can be geographically distributed away from the software application module (SAM) and sway from the software application interface module (SAIM), and also function in circumstances where the software application module (SAM) is mobile.

20 Claims, 16 Drawing Sheets

ABC FOOD CORPORATION

P.O. Box 1234
Sometown, MA 03999
1-800-800-8000

Store: Food Shops 2201
ROUTE 117
Warwick, RI 02912
CUSTOMER # 024985
06/14/2012  10:28:41 PM

| Qty | UPC | Item Description | Price | Ext Price |
|---|---|---|---|---|
| 1 | 4000112202 | Sparklg Bev, Orange, 11OZ | 19.65 | 19.65 |
| 1 | 4000112203 | Detox Bev, Lemon, 16OZ | 36.46 | 36.46 |
| 7 | 4000112204 | Instant Natural Bev, 7OZ | 13.22 | 92.54 |
| 9 | 4000112205 | Sparklg Bev, Apple, 25OZ | 13.57 | 122.13 |
| 9 | 4000112206 | Key Lime Soda, 24PK, 12OZ | 24.00 | 216.00 |
| 5 | 4000112207 | Sparkling, Limonata, 11OZ | 19.75 | 98.75 |
| 32 | | Subtotal, Beverages | | 585.53 |
| 8 | 4000112310 | Chocolate Fudge Birthday | 34.89 | 279.12 |
| 8 | 4000112311 | Chocolate Double Dare, 24OZ | 29.60 | 236.80 |
| 8 | 4000112312 | Cherry-Choco Lovers Cake | 32.95 | 263.60 |
| 8 | 4000112313 | Pineapple Rum Cake, 33OZ | 26.92 | 215.36 |
| 8 | 4000112314 | Key Lime Rum Cake, 16OZ | 14.58 | 166.64 |
| 8 | 4000112315 | Cinnamon Walnut Coffee | 20.95 | 167.60 |
| 5 | 4000112316 | Carrot Cake, 44OZ | 45.98 | 229.90 |
| 15 | 4000112317 | Yellow Cake Mix, 4PK, 15OZ | 23.36 | 350.40 |
| 68 | | Subtotal, Cakes | | 1,859.42 |

Total  $2,444.95

FIG. 7

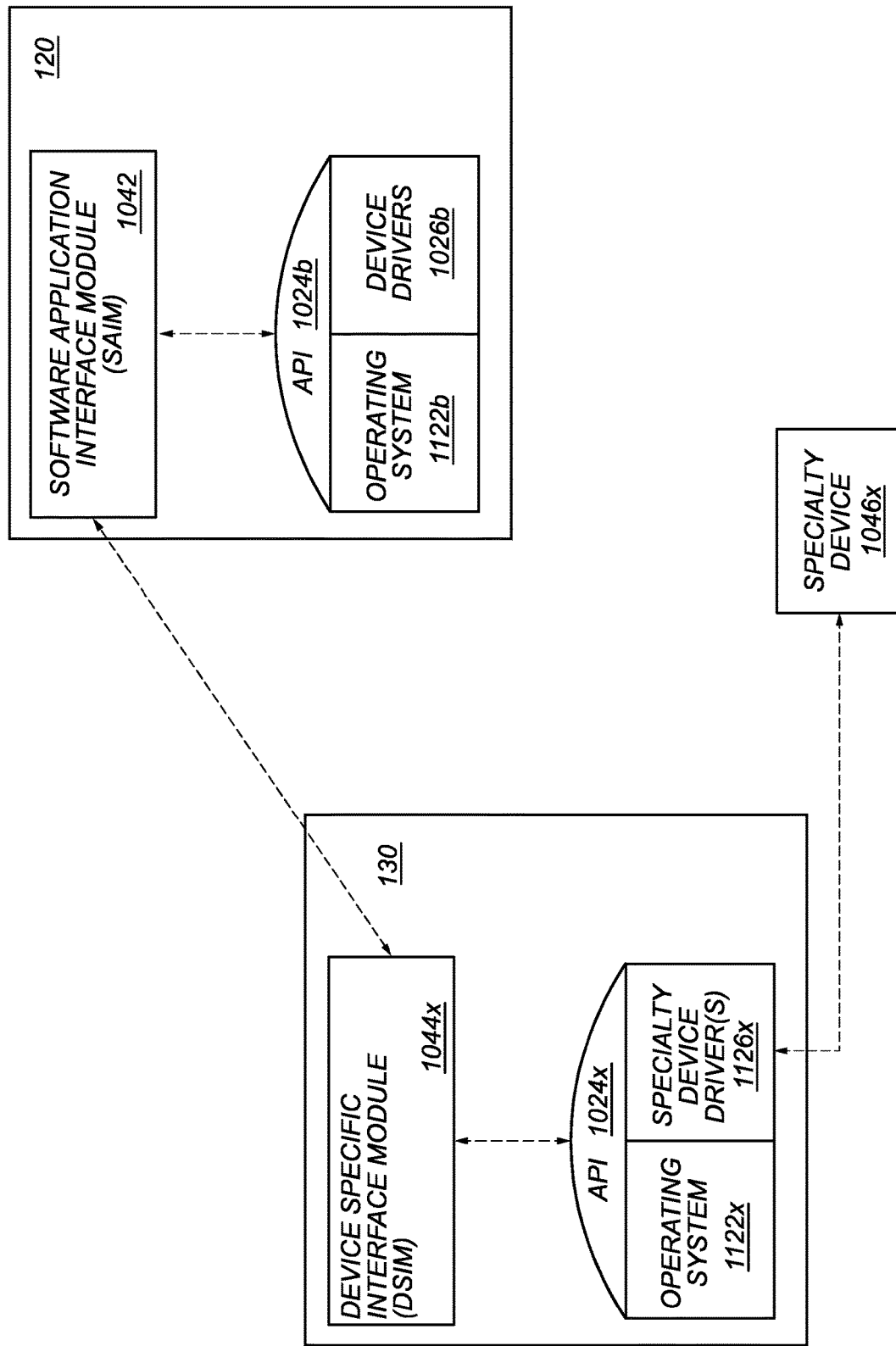

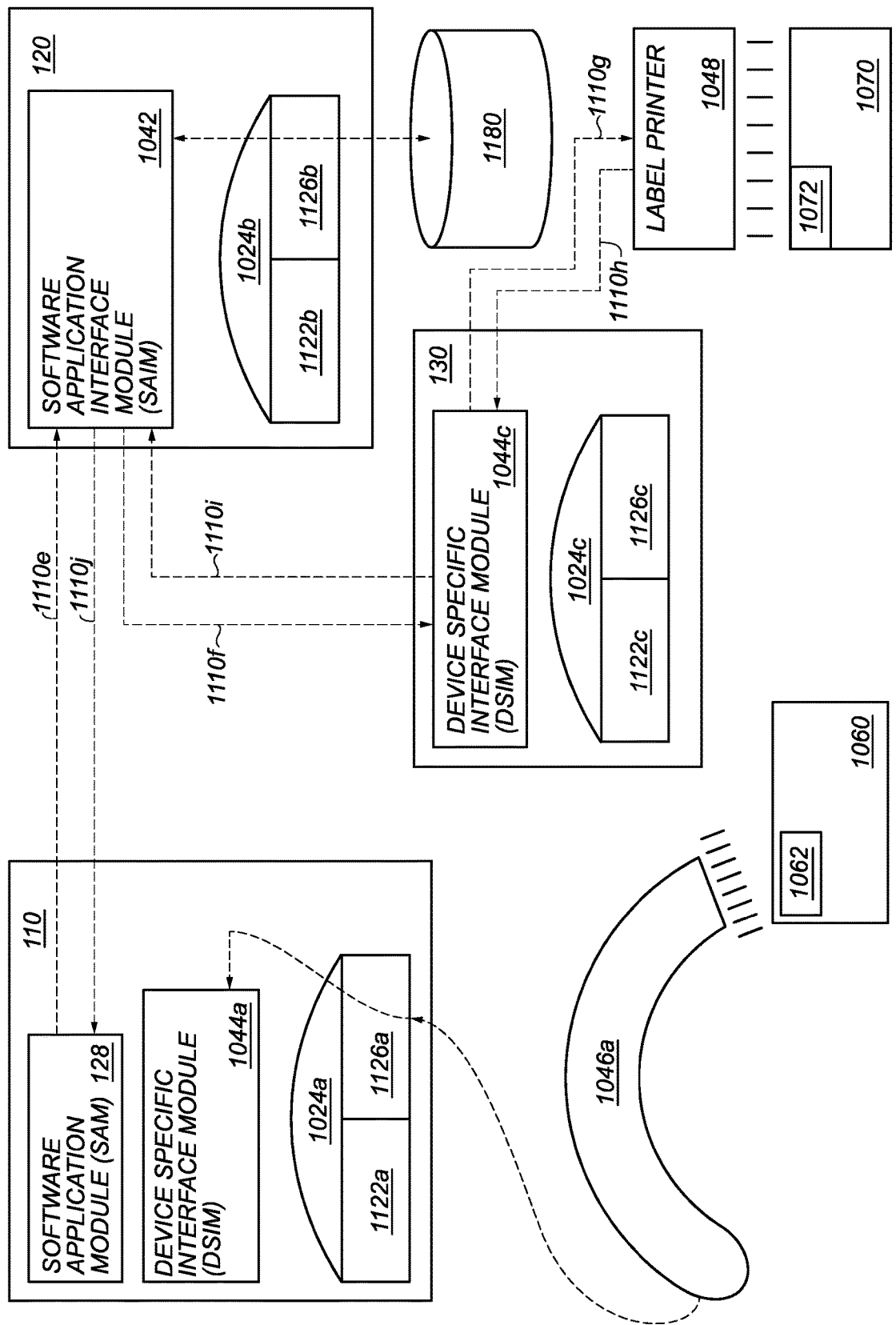

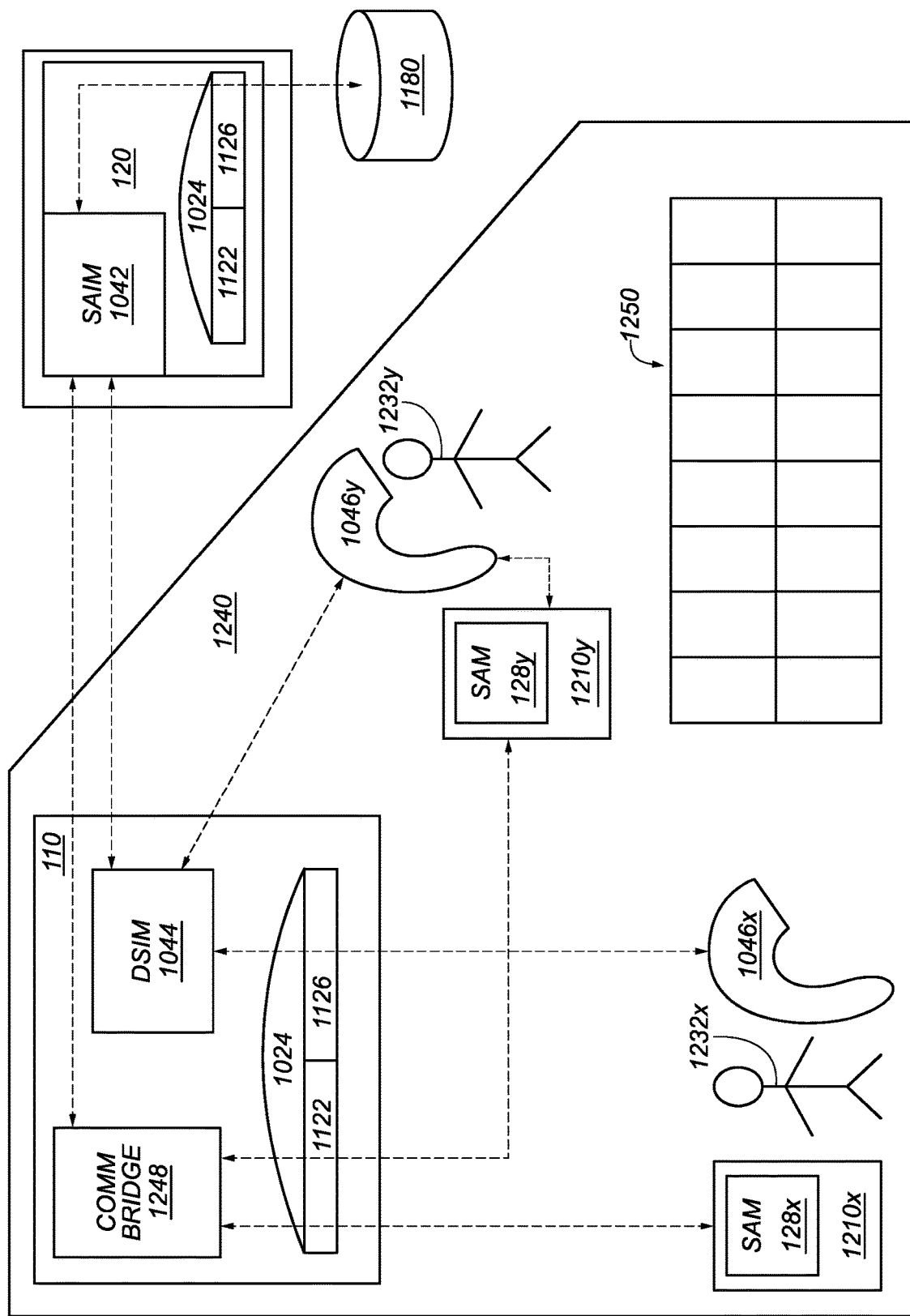

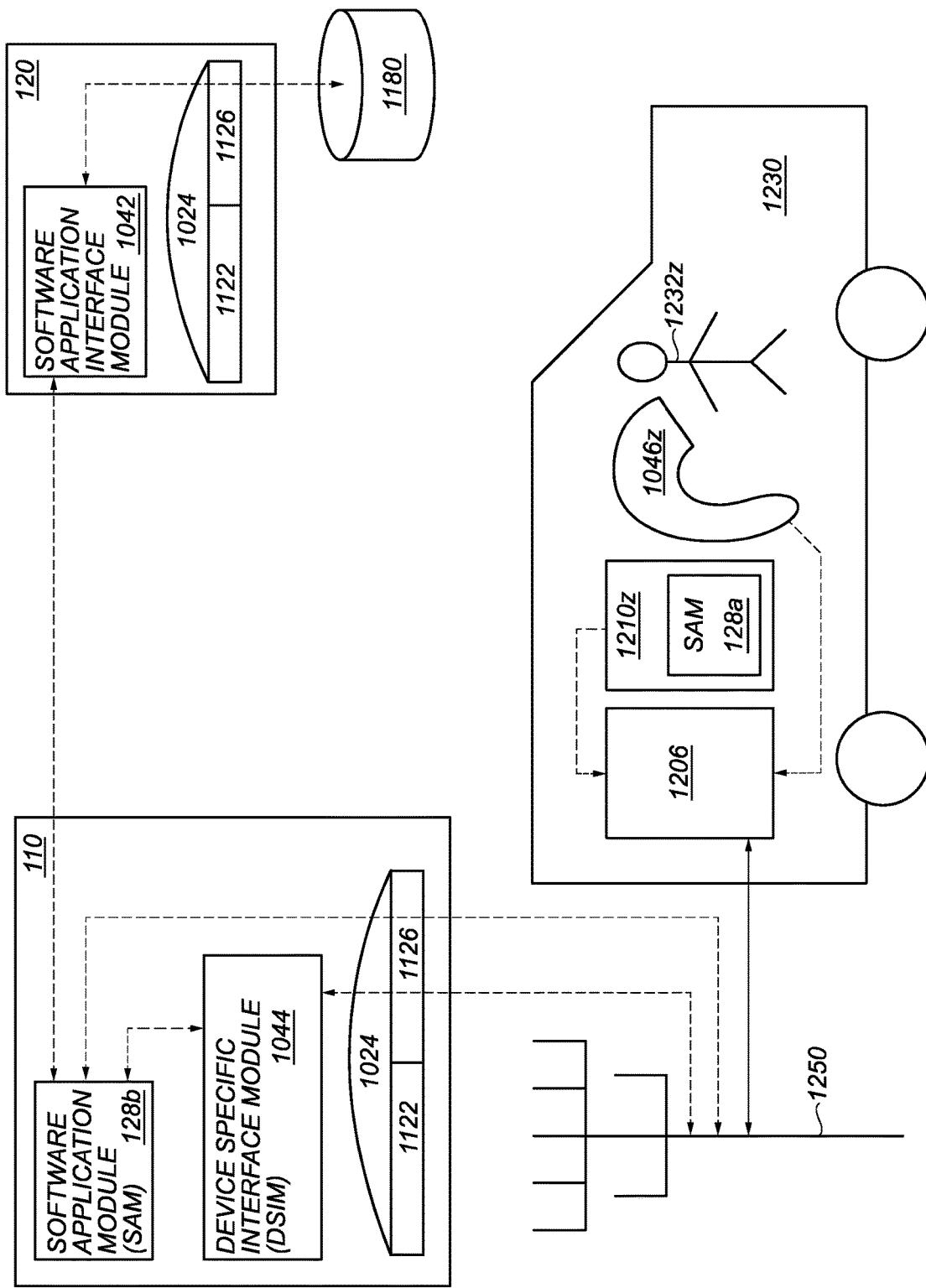

SYSTEM FOR PROVIDING REMOTE INTEROPERATION BETWEEN DEVICES

This document, being a United States utility patent application having a Ser. No. 18/070,379, is a non-provisional (continuation-in-part) utility patent application that claims priority and benefit to, U.S. non-provisional patent application having Ser. No. 17/480,122, that was filed on Sep. 20, 2021 and that is entitled "SYSTEM FOR PROVIDING REMOTE INTEROPERATION BETWEEN DEVICES", and which is incorporated herein by reference in its entirety.

The non-provisional patent application is a non-provisional (continuation-in-part) utility patent application that claims priority and benefit to, U.S. provisional patent application having Ser. No. 63/194,702, that was filed on May 28, 2021 and that is entitled "SYSTEM FOR PROVIDING REMOTE INTEROPERATION BETWEEN SPECIALTY DEVICES", and which is incorporated herein by reference in its entirety.

This document is a continuation-in-part patent application, that also claims priority and benefit to, co-pending United States (U.S.) non-provisional utility patent application having Ser. No. 16/951,825, that was filed on Nov. 18, 2020, and that is entitled "System for Providing an Alternative Control Interface to Specialty Devices", and which is scheduled to issue as U.S. Pat. No. 11,126,570 on Sep. 21, 2021, and which is incorporated herein by reference in its entirety.

The patent application is a continuation of, and claims priority and benefit to, co-pending U.S. non-provisional utility patent application having Ser. No. 16/512,135, that was filed on Jul. 15, 2019, and that is entitled "System for Providing an Alternative Control Interface to Specialty Devices", and which issued as U.S. Pat. No. 10,846,244 on Nov. 24, 2020 and which is incorporated herein by reference in its entirety.

All of the above referred to documents, including such as patent applications, patent publications and/or patents, are herein incorporated by reference in their entirety.

This document includes subject matter generally related to that of U.S. Pat. No. 10,354,101 which issued on Jul. 16, 2019 and that is entitled "System for Providing an Alternative Control Interface to Specialty Devices". All of the aforementioned patents, patent publications and other publications are herein incorporated by reference in their entirety.

BACKGROUND OF THE INVENTION

Specialty devices are devices that are designed to perform actions in response to receiving commands to perform such actions. These devices have some communication capability via a wireless or wireline communications protocol. However, many of these devices upon being first sold, typically do not initially enjoy device driver support from a variety of, or from any operating systems, and as a result, these specialty devices are at least initially designed to be used without necessarily communicating with an operating system. Hence, these devices are characterized as being special, in that they are atypical relative to other devices that upon being first sold, enjoy device driver support from one or more operating systems. After being first sold, some specialty devices may gain device driver support over time in association with one or more operating systems.

Specialty printer devices are a sub-category of specialty devices. A specialty printer device is designed to transfer information onto various types of portable media. Such portable media typically excludes the standard 8.5×11 inch paper media, which is printed upon by many commonly available office printers. Upon first being sold, these types of devices are typically designed to perform functionality that may not be directly accessible via communication with most computer operating systems. Hence these devices are characterized as being special, as they are atypical relative to many commonly available office printers that are sold in high volume within the desktop computer market, and that typically enjoy some amount of operating system device driver support upon being first sold.

The discussion above is merely provided for general background information and is not intended to be used as an aid in determining the scope of the claimed subject matter.

BRIEF DESCRIPTION OF THE INVENTION

The invention is a method, system and apparatus for providing an alternative applications programming interface (API), for a software application to interface with and control the operation of a variety of one or more specialty devices, some of which are also referred to herein as specialty printing devices. The alternative API provides a superset of control functionality relative to an API that is typically provided by a specialty device driver. In some embodiments, the alternative API is provided via a specialty device module (SDM), also referred to herein as a specialty device interface module (SDIM), and in some embodiments, a specialty printing module (SPM) that is remotely accessible to a software application via a computer network.

The SDM can provide for interface and control of specialty devices that would otherwise be un-accessible to a software application via a specialty device driver, and can provide such locally or remotely accessible functionality to the software application without necessarily requiring employment of a specialty device driver.

The SPM can provide for interface and control of specialty printing devices that would otherwise be un-accessible to a software application via a specialty printing device driver, and can provide such locally or remotely accessible functionality to the software application without necessarily requiring employment of a specialty printing device driver.

This brief description of the invention is intended only to provide a brief overview of subject matter disclosed herein according to one or more illustrative embodiments, and does not serve as a guide to interpreting the claims or to define or limit the scope of the invention, which is defined only by the appended claims.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention can encompass other equally effective embodiments. The drawings are not necessarily to scale. The emphasis of the drawings is generally being placed upon illustrating the features of certain embodiments of the invention. In the drawings, like numerals are used to indicate like parts throughout the various views. Differences between like parts may cause those parts to be indicated with different numerals. Unlike parts are indicated with different numerals. Thus, for further understanding of the invention, reference can be made to the following detailed description, read in connection with the drawings in which:

FIG. 7 illustrates a report that is rendered (printed) onto media of a specialty printer.

FIGS. 11A-11C illustrate a simplified representation of an embodiment of the invention where the software application interface module (SAIM) 1042 is employed to coordinate a price lookup operation and a label operation.

FIGS. 12A-12B illustrates a simplified representation of embodiments of the invention where a mobile devices and Wi-Fi hotspots are employed to enable mobile access to the system of the invention.

DETAILED DESCRIPTION OF THE INVENTION

Figure 1:
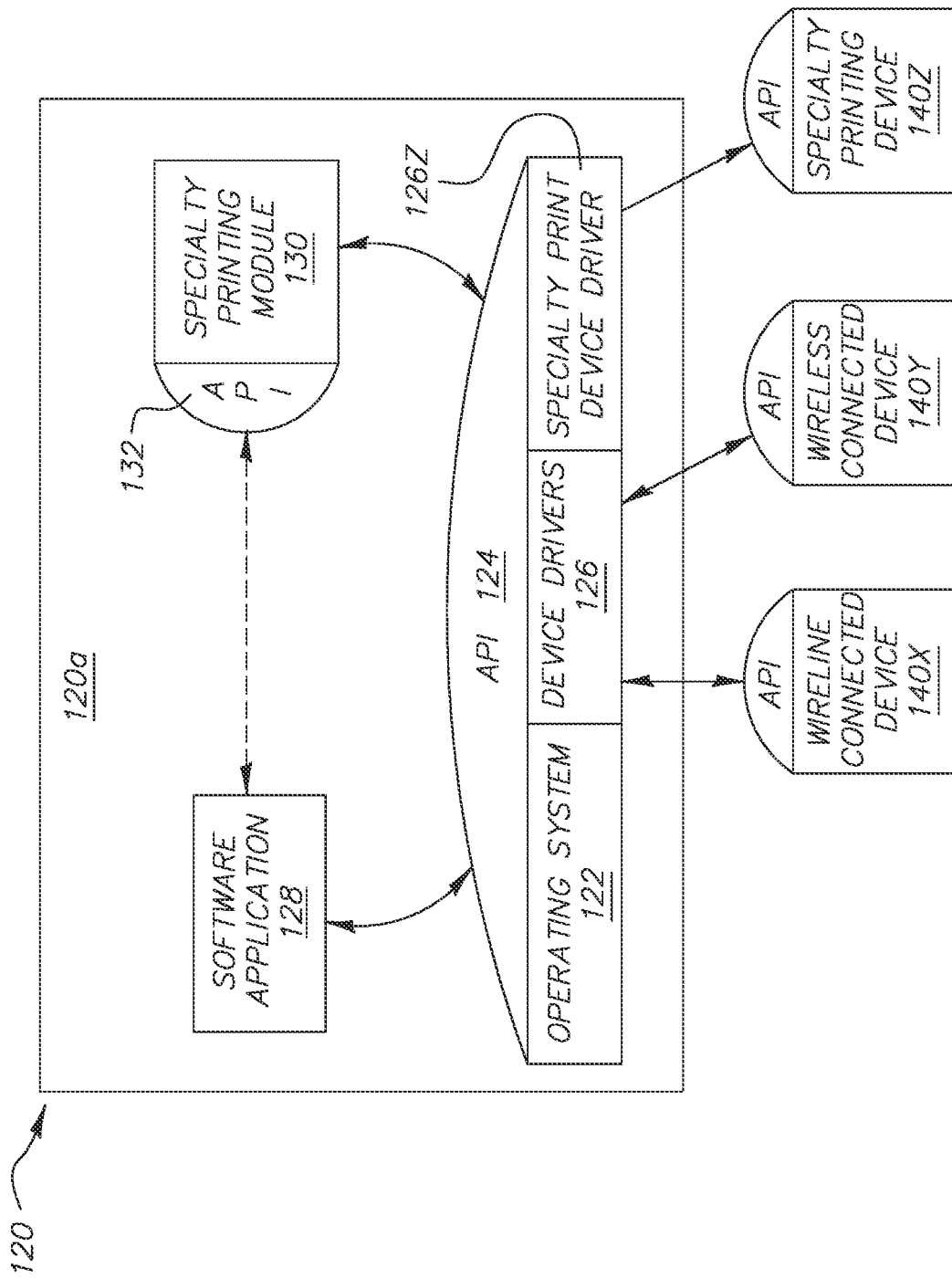
FIG. 1 illustrates communication between a specialty printing module and other software executing within a virtual address space of a computer system.

FIG. 1 illustrates communication between a specialty printing module (SPM) 130 and other software executing within a virtual address space 120a of a computer system 120. The SPM 130 in interchangeable with a specialty device module (SDM), which is also referred to herein as a specialty device interface module (SDIM). As shown, a software application 128 communicates with a specialty printing module 130 via an applications programming interface (API) 132 of the specialty printing module 130.

The software application 128 communicates with the SPM 130 via a first communications channel provided by the operating system (OS) 122. For example, in some embodiments, this first communications channel is a socket communication mechanism provided by the operating system 122 to the software application 128 and to the specialty printing module (SPM) 130. To exercise this socket mechanism, the software application 128 and the SPM 130 each communicate with the operating system 122 via exercise of an applications programming interface (API) 124 provided by the operating system 122 itself.

In other embodiments this communications channel is implemented via OpenURL( ) method call which is available within the applications programming interface (API) of a Java programming environment. A uniform resource locator (URL) is applied as an address of the SPM 130. A URL is a type of uniform resource identifier (URI). Another type of URI is a uniform resource name (URN).

In this circumstance, the URL address of the SPM 130 is employed by the software application 128 to access and to exercise the programming interface of the SPM 130. In other words, the SPM 130 programming interface is exercised by another software component, such as the software application, through the URL address. Also, in these circumstances, the software application 128 and the SPM 130 can reside upon the same computer and are local to each other, or can each reside on different computers. These different computers can be located proximate to or remote from each other. In other embodiments, a uniform resource name (URN) can be employed and mapped to a URL. Similar URL address based mechanisms can be employed to provide a communication for specialty printer discovery (See FIG. 6)

The operating system 102 communicates with various devices 140x-140z via a set of device drivers 126, including device driver 126z, which function as an extendable and configurable portion of the operating system 122. The operating system 122 interfaces with a wireline connected device 140x via a wireline connected device driver included within the set of device drivers 126. The operating system 122 interfaces with a wireless connected device 140y via a wireless connected device driver that is included within the set of device drivers 126. The operating system 122 interfaces with a specialty printer device 140z via the specialty printer driver 126z, that is also included within the set of device drivers 126.

In this circumstance, the computer 120 and the operating system 122 executing on the computer 120, are each referred to herein as having a direct connection to the devices 140x, 140y and 140z. A direct connection is not required to practice the invention. As referred to herein, a direct connection, which is also referred to herein as a direct communications connection, is a communications connection between a first end point and a second end point where there is no intervening computer disposed in between these two end points for effecting communication between these two end points. In terms of functionality, the device drivers 126 each have an applications programming interface (API) that typically provides functional control of a device, also referred to herein as device control, that is specific to a design of that particular device 140x-140z. This type of functional control is enabled via a set of commands that reflect a specific design of a device 140x-140z and that are processed when received by the device 140x-140z. These commands also referred to as providing a lower level (physical) access to and control of each of the devices 140x-140z.

Via the operating system 122 and its device drivers 126, the software application 128 can also communicate with each of the devices 140x-140z. However, such communication is limited to the limitations within each of the set of device drivers 126, including the device driver 126z. Typically, a device driver API provides access to specific functions of the device. As a result, the software application 128 is also limited to communicating (invocation of) specific functional commands of each of the devices 140a-140z via the operating system 122 and its device drivers 126.

Conversely, the specialty printing module 130 provides an alternative and different applications programming interface (API) 132 relative to that provided by the API 124 of the operating system 122 via its device drivers 126. Like that provided by the operating system 122, the specialty printing module (SPM) API 132 provides access to specific functions of a device 140x-140z and further provides a superset of the functional control that is provided by the operating system 122 via its drivers 126. This superset includes higher level functions for which the software application 128 can invoke (communicate) to the device 140z via the specialty printing module (SPM) API 132.

For example, the software application 128 can communicate a command that prints a report onto label media. The report can include multiple tables and fields that collectively define a printing of a label onto a product to be placed on sale. Some of these fields store values that are fixed while other fields store values that are accessed from other sources, or that are computed during the construction of the report. Some of these non-fixed and computed values are based upon limitations (design characteristics) that are specific to each of the devices 140x-140z. The report may also include barcodes and other graphics and can define an arrangement of fields having unusual patterns.

Placement (printing) of portions of the report, such as of a location of numerical fields and barcodes, may be subject to alignment and placement at locations onto printable output media that are based and determined upon one or more physical limitations (design characteristics) of the specialty printing device 140z. Rather than the software application 128 determining and specifying at what specific location a field should be placed (printed), via factoring characteristics and limitations of the device 140x-140z, the specialty printing module 130 will perform such a determination based upon general rules selected by the software application 128 and limitations (design characteristics) of the particular device 140x-140z.

These general rules are embedded into a report specification module (See FIG. 4), which can be executed by the software application 128. The software application 128 also invokes a report builder module to generate commands that are targeted and directed to a specific device 140x-140z. The specialty printing module 130 delivers the device targeted commands to the device 140x-140z via the operating system 122 and at least one of its device drivers 126.

In some circumstances, the specialty printing device 140z has a universal serial bus (USB) wireline connection to the computer system 120. In this circumstance, the operating system 122 and at least a USB device driver would be employed to communicate (deliver) the device targeted commands from the specialty printing module 130 to the specialty printing device 140z. In other circumstances, the specialty printing device 140z has a wireless Wi-Fi communication connection to the computer system 120. Likewise, in this circumstance, the operating system 122 and at least a Wi-Fi device driver would be employed to wirelessly communicate (deliver) the device targeted commands from the specialty printing module 130 to the specialty printing device 140z.

Figure 3:
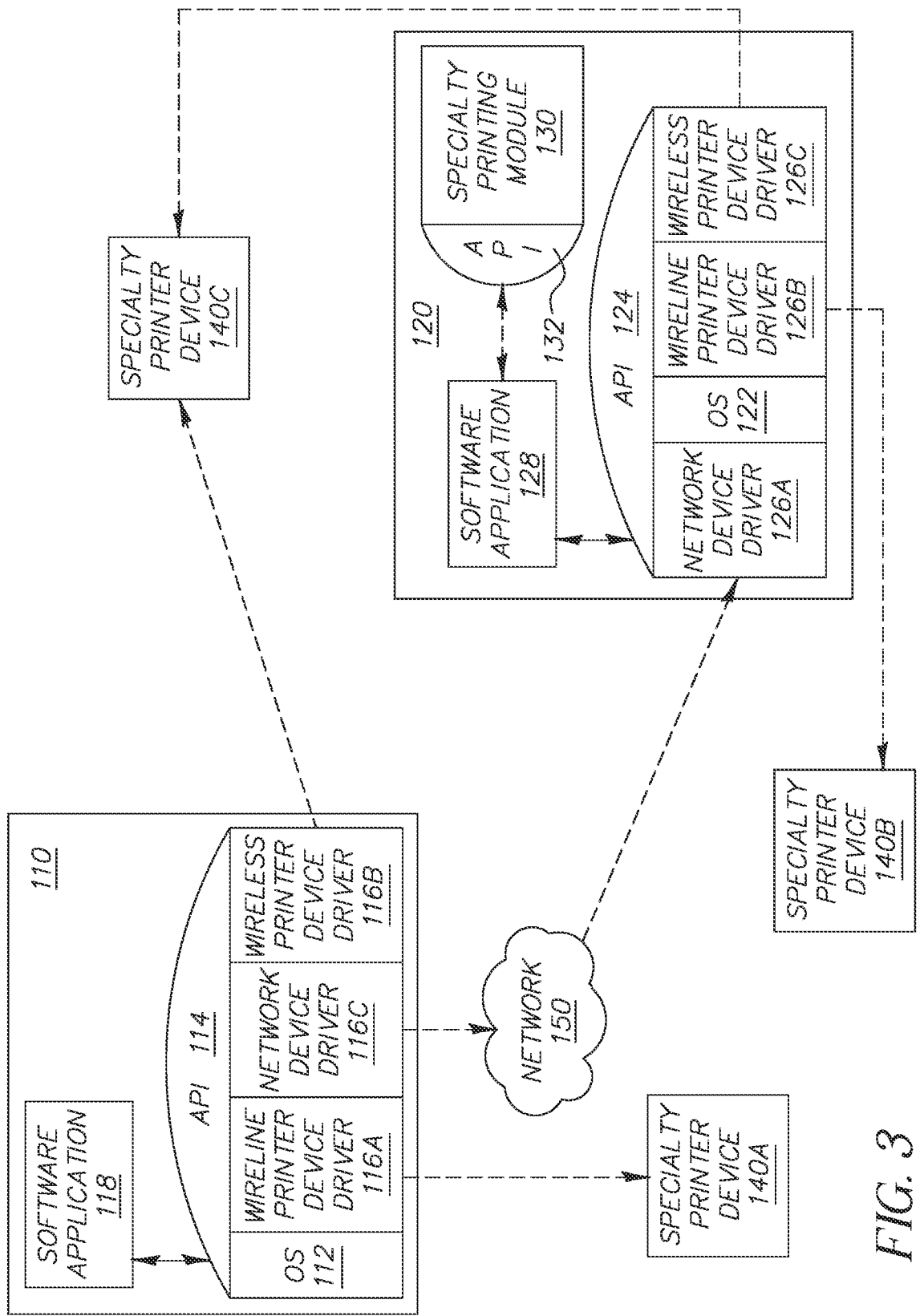
FIG. 3 illustrates communication between a plurality of host computer systems and a variety of output devices (specialty printers).

Furthermore, as shown in FIG. 3, another software application 118 executing on another computer system 110 may communicate with the specialty printing module 130 that is executing on this computer system 120, in order to access and control a specialty printing device that is not directly accessible from the another computer system 110 and upon which the software application 118 resides.

At least one of various types of communications channels can be employed between the software application 118 and the specialty printing module 130 to enable communication to each other through a network 150. Such a communications channel, such as a socket to socket or OpenURL( ) accessed communication channel, for example, is typically accessible via their respective operating systems (OS) 112, 122 and via their respective applications programming interfaces (API) 114, 124 to these respective operating systems 112, 122. In accordance with the invention, a module, whether it is a specialty printing module 130 or some other type of module, is preferably addressable and accessible to communicate with, via a uniform resource locator (URL) that is uniquely assigned to that module.

Figure 2:
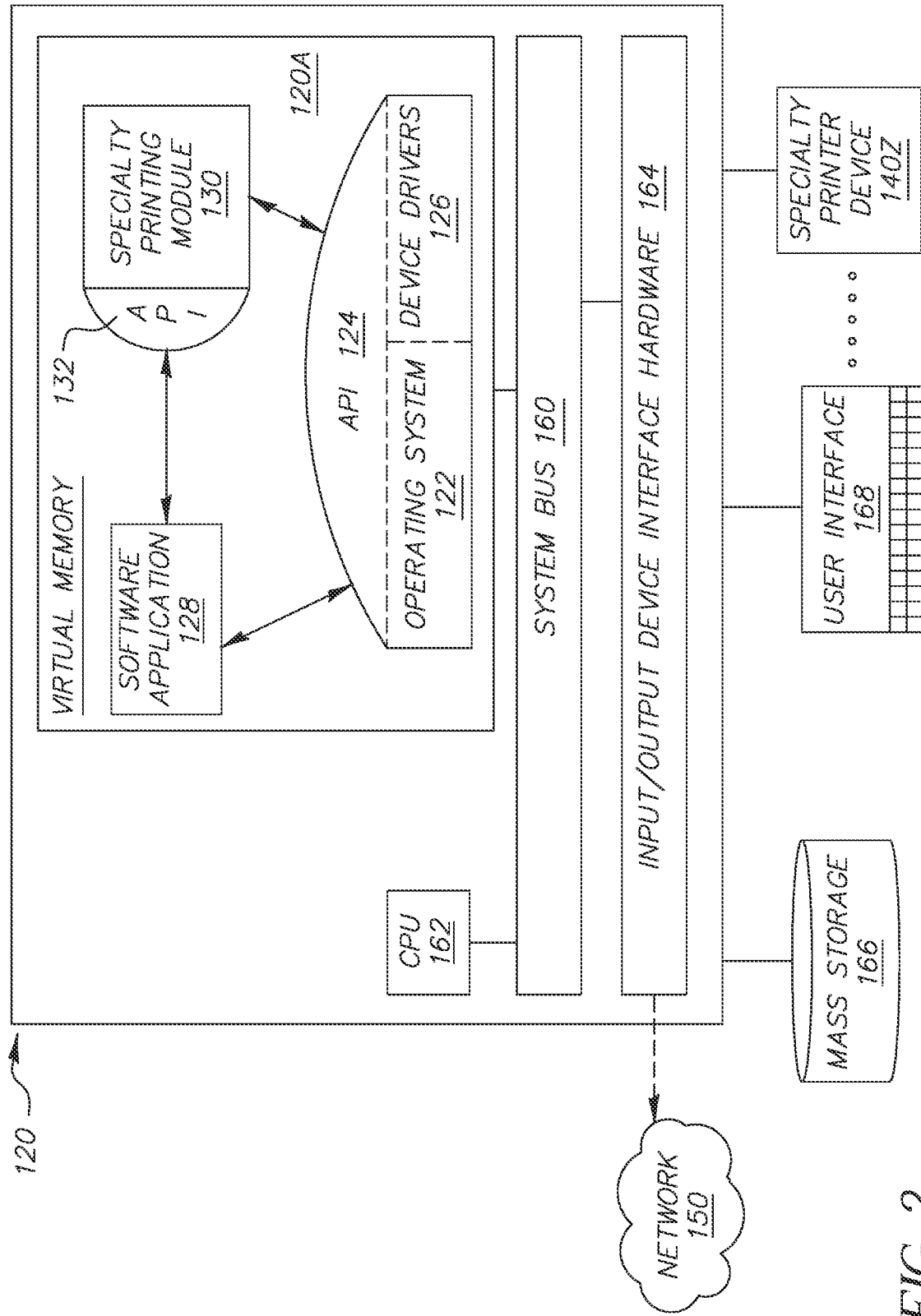
FIG. 2 illustrates a simplified representation of hardware and software residing within a host computer system.

FIG. 2 illustrates a simplified representation of hardware and software residing within the host computer system 120, also referred to herein as a computing platform 120. As shown, the computer system 120 includes at least one system bus 160 which is electronically connected to a central processing unit (CPU) and random access memory (RAM), which is employed to provide a virtual address space (virtual memory) 120a for storage of software executing on the computer system 120. Device interface hardware 164 is also electronically connected to the system bus 160 and is employed for performing transfer (input and output) of data between components 120a, 162 that are internal to the computer system 120 and devices 140z, 166-168 that are connected to it 120. A mass storage device, such as a hard disk 166 or other non-volatile data storage device, and user interface hardware, such as collectively a liquid crystal display (LCD) screen with mouse and a keyboard 168, are at least among the devices that are connected to the computer system 120. Also note that network interface hardware is employed for electronic connection to a communications network 150 and is not explicitly shown here.

FIG. 3 illustrates communication between a plurality of host computer systems 110, 120 and a variety of specialty printer devices 140a-140c. As shown, a host computer 110 includes hardware and various software components like that shown for computer system 120 in FIG. 2. The host computer system 110, also referred to herein as a computer system or a computer 110, has software including an operating system 112.

The operating system 112 includes an applications programming interface (API) 114, one or more device drivers 116a-116b, also referred to herein collectively as the device drivers 116 of computer 110. These device drivers 116 include such as one or more network device driver(s) 116c, and one or more specialty printer device drivers 126a-126b. These specialty printers 140a-140c are also referred to herein as specialty devices 140a-140c, because some specialty printers function more as an specialty type of device than an actual printing device.

The operating system 112 includes an API 114 that is a programming interface between the operating system 112 and each of one or more software application programs 118 executing on the computer system 110. The network device driver 116c interfaces with electronic hardware (electronics) that provides access to a particular type of communications network 150. This hardware may interface with a network having a wired topology, referred to herein as a wired or wireline type of network, such as an Ethernet network, or this hardware may interface with a network having a wireless topology, referred to herein as a wireless type of network, such as the wireless IEEE 802.11 network.

Device drivers may be assigned to multiple categories that overlap. For example, a device driver that interfaces with an Ethernet network would fall into both a network communications device driver and a wireline connected device driver category, and a device driver that interfaces with an IEEE 802.11 network, would fall within both a network communications device driver and wireless communications device driver category.

As shown in FIG. 3, the computer 110 has a wireline connection to a type of specialty printing device 140a, which is also generally referred to herein as a specialty output device, or as a specialty printer 140a. A specialty printer, is a type of output device that performs functions that are outside the capabilities of conventional type of paper document printer. A specialty printer can be designed to transfer information in the form of ink deposited onto media, or transfer information that is in a form other than ink, such as an electrical encoding of a numerical value into or onto appropriate media designed to store such a value.

Although a specialty output device (printer) has capabilities outside that of a conventional document printer, in some embodiments, a specialty printer can print a document onto media, such as in the form of ink onto paper media, or as in the form of ink onto non-paper media, or as in the form of depositing other than ink onto non-paper media. However, because some embodiments of a specialty printer can effectively print a document in some manner, such embodiments of a specialty printer may not be able to print a document as wells as, for example as quickly or as accurately, as some conventional document printers.

As referred to herein, a printing device may or may not be designed to deposit ink onto a media. In some embodiments, a printing device that is referred to herein as a direct thermal printer, is designed to direct heat towards heat sensitive media, causing marking (printing) of the heat sensitive media. In other embodiments, a printing device that is referred to herein as an indirect thermal printer, is designed to employ heat to cause ink to deposit onto media and to effect printing of the media.

As an ink depositing type of printer, a specialty printer can be designed to deposit ink onto a special type of media, such as label media, or to deposit ink onto more common types of media, such as onto one or more sheets of paper for the purpose of printing documents. Label media, can be manufactured into many forms, and is typically manufactured and packaged into a roll of media, and is cut into individual sheets as needed. As cut, these sheets have an adhesive rear side and a printable forward side. The forward side is designed to store information in the form of ink deposits arranged to represent text fonts and graphics and images. These deposits can also include various types of printed barcode information. The text fonts can be arranged in various patterns, including horizontal lines, or other than horizontal lines, and can be patterned and directed along a horizontal direction, along a vertical direction and/or along a diagonal direction, for example.

Alternatively, a specialty printer can for example, store a numerical code inside of media that functions as a radio frequency identification (RFID) transponder. Such media is typically non-paper based media, such as that made from a polymer. The media may be packaged in a form that requires cutting or may be pre-separated and optionally stacked, prior to or after processing (printing) of the media. In this circumstance, a processed unit of media could function as an RFID transponder, where "printing" of this unit of media causes information to be encoded within an RFID transponder that is disposed within this unit of media.

The media, whether or not it is made from a particular type of material, such as some type of paper or polymer, may require some form of delimitation and separation via a cutting or tearing action, to delimit and separate each unit of media. For example, with respect to label media, a unit of media could constitute one processed (printed) label. With respect to RFID media, a unit of media would be a processed (numerical code stored) RFID transponder.

As shown in FIG. 3, the computer 110 communicates with another computer 120 via a communications network 150. The computer 120 may be located within the same room, or the same building, may be located many miles from computer 110. As shown, the computer 110 has a direct connection to (1) output device 140a, referred to herein as specialty printer 140a, and a direct connection to another specialty printer device 140c. The computer 120 also has a direct connection to (2) associated output devices, also referred to herein as specialty printers 140b-140c. Note that in the embodiment described here, each of the specialty printers 140a-140c, are not the same type of printer and are instead each designed to function as a particular and a different type of output device (specialty printer). In other hypothetical embodiments, each of the specialty printers are not necessarily different from each other.

The computer 120 has executing upon it, a specialty printing (software) module 140 that interfaces with an operating system 122, via an API 124 of the operating system 122. The specialty printing module 130 also interfaces with a software application 128 residing and executing on the same local computer 120. The specialty printing module 130 also provides an application programming interface (API) 132 for one or more executing software applications 118, that reside on the remotely located computer 110.

This API 132 of the specialty printing module 130 is designed to provide a programming interface for local (128) and remotely located (118) software applications 118, 128 to interface with a particular specialty printer 140a-140c. A first portion of the API 132 is characterized as processing device specific (low level) commands, meaning that the specialty printing module 130 passes through commands received from the software application 118, 128 to the specialty printer 140a-140c. A second portion of the API 132 is characterized as processing other (high level) commands, meaning that the specialty printing module responds to directly, or translates a high level command into a set of one or more lower level commands for delivery to the particular specialty printer 140a-140c.

The design of the API 132 is an alternate and unique API as compared to what is typically provided by a device driver 116, 126. Furthermore, this API 132 is designed to be accessible from both local software applications 128 that are executing on the same computer 120, and designed to be accessible from remote software applications 118 via a network 150, that are executing on other remote computer systems, such as computer 110, for example.

Via the specialty printing module 130 and the network 150, the software application 118 executing on computer 110, can access either or both of the remotely located specialty printers 140b-140c via the computer 120 that is accessible to the computer 110 via the network 150. Furthermore, this remotely located software application 118 can access these printers via a uniformly designed API 132 that is provided by the specialty printing module 140. Likewise, the software application 128 that resides local to computer 120, can also access and interface with these specialty printers 140b-140c, which are directly accessed via a direct connection by computer 120, via the same uniformly designed API 132 provided by the specialty printing module 130.

Without the specialty printing module 130, the software application 118 would have no access to the specialty printer 140*b*, given that there is no other mechanism available to the software application 118 providing such access. Without the specialty printing module 130, the software application 128 would be required to interface with the specialty printer 140*b* via a device driver 126*b* of a first particular design and required to interface with specialty printer 140*c* via device driver 126*c* of a second particular design. Because specialty printers 140*b* and 140*c* are different types of devices, that each have a different function and design relative to each other, the device drivers 126*b* and 126*c* would likewise be expected to each have a different design relative to each other, and furthermore, each of the device drivers 126*b* and 126*c* would each likely provide a API that is separately and differently designed relative to each other.

With separate and differently designed device drivers 126*b*-126*c*, the software application 128 would be required to include additional software to separately interface with each of both of the device drivers 126*b*-126*c*. Furthermore, at least one or both of these device drivers 126*b*-126*c* will likely provide a more limited programming interface, and likely provide a programming interface that is a subset of that provided by the specialty printing module (SPM), to each specialty printer 140*b*-140*c*.

Importantly, the specialty printing module 130, which resides on computer 120 as shown, provides to the software application 118 of computer 110, an indirect connection to the (2) specialty printers 140*b*-140*c* of computer 120, via the API 132 of the specialty printing module 130. The specialty printing module 130 also provides its API 132 to a software application 128 that is executing local to it 130 on the computer 120. The software application 128, residing on the same computer 120 as the SPM 130, has a direct connection to the SPM 130 via the computer 120.

Figure 4:
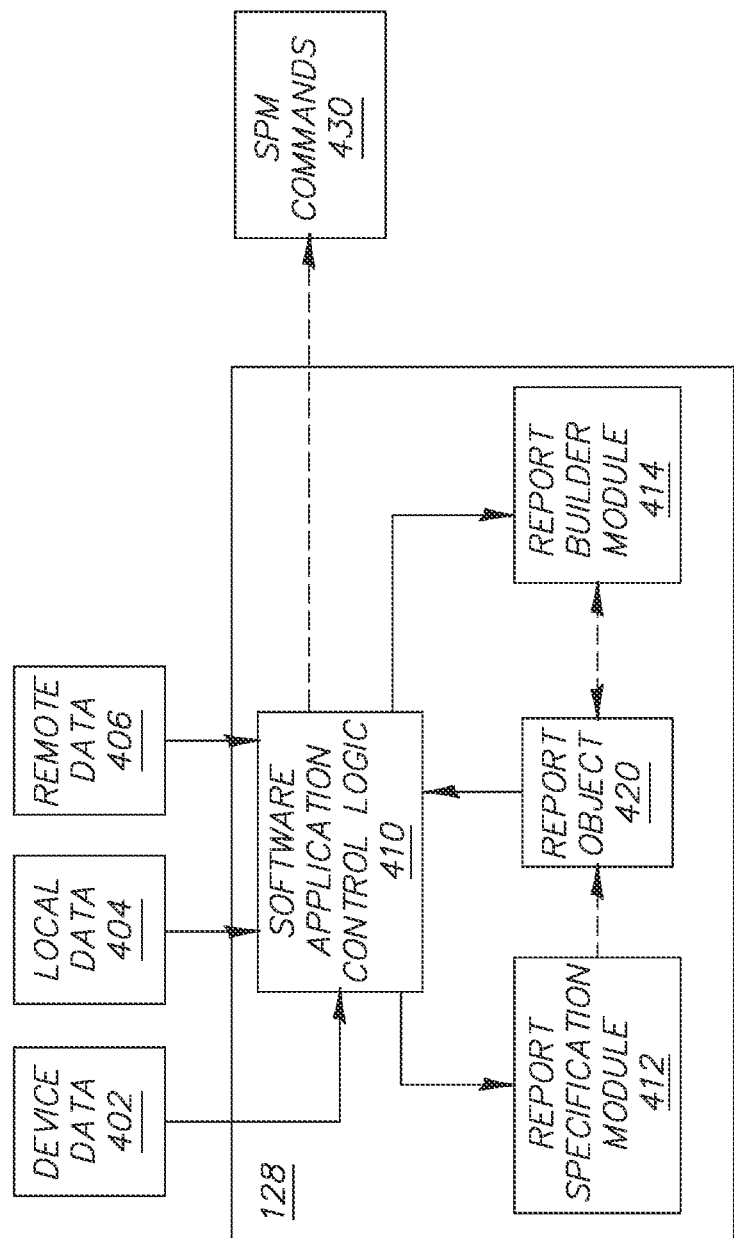
FIG. 4 illustrates a simplified representation of the internals of an embodiment of the software application of FIG. 3.

FIG. 4 illustrates a simplified representation of the internals of an embodiment of the software application of FIG. 3. As shown, the software application 128, includes control logic 410 that is designed to control operation of the software application 128. Via execution of the control logic 410, the software application 128 inputs device data 402, local data 404 and/or remote data 406.

Device data 402 is encoded information that describes characteristics and limitations of a specialty printing device 140*a*-140*c* whose operation is to be controlled via commands within a report that are to be generated by the software application 128. Data, including device data 404, can also be accessed from a local source 404 and/or from a remote source 406. Such data can include for example, static information such as a number of columns for printing, or include dynamic information such as date and time information.

The software application control logic 410 executes a report specification module 412 for defining a structure of a report. The structure of the report is defined in terms of one or more tables, fields, barcodes etc. The report can define a sales receipt, optionally with total and subtotal values. The report specification module 412 generates a report object 420 which functions as a template for a report to be generated. The software application control logic 410 further initiates execution of a report builder module 414 that functions to complete construction of the report object 420. Within the report object 420, commands are generated to control operation of the specialty printing module (SPM) 130 and to control operation of a targeted specialty device 140*a*-140*c*. Collectively, these commands are referred to herein as specialty printing module (SPM) commands 430, or as specialty device module (SDM) module commands. These SPM or SDM commands are communicated from the software application 128 to the specialty printing module 130, or to the specialty device module (SDM), where applicable.

Figure 5:
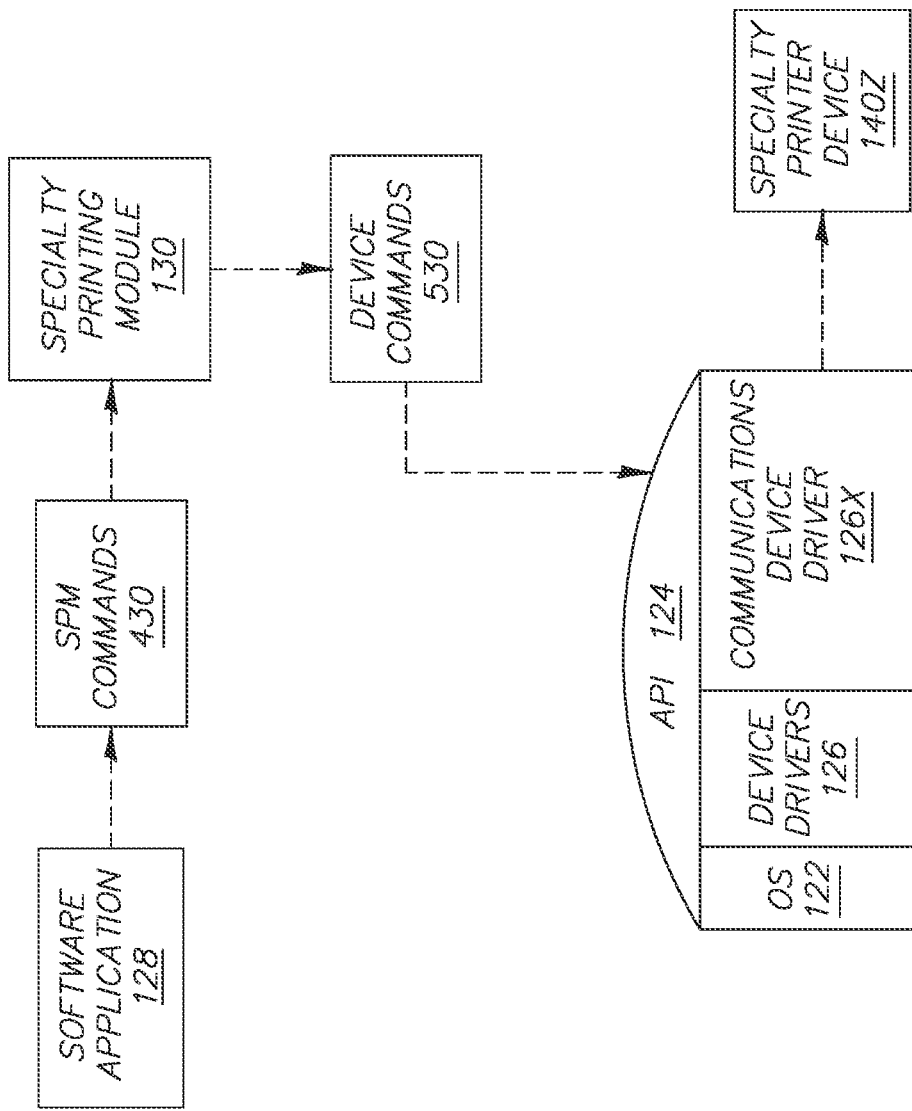
FIG. 5 illustrates a simplified representation of communication between the software application, specialty printing module, operating system and the specialty printer device.

FIG. 5 illustrates a simplified representation of communication between the software application 128 and the specialty printing device 140*z* via a communications device driver 126*x*. As shown, the software application 128 communicates SPM commands 430 to the specialty printing module 130 as described in association with FIG. 4. The specialty printing module 130 interfaces with the API 124 of the operating system 122 to communicate the device specific commands 530 to the specialty printing device 140*z*. As described herein, the SPM 130 in interchangeable with a specialty device module (SDM), which is also referred to herein as a specialty device interface module (SDIM). In a pass through mode, device specific commands that are embedded into the SPM commands 430 are passed through the SPM 130 and relayed to the specialty device 140*z*.

Notice that the SPM 130 communicates the device commands 530, not through a specialty printer device driver 126, but instead communicates the device commands 530 via a communications device driver 126*x* to the specialty printing device 140*z*. A communications device driver 126*x* is designed for a specific type of communication and is not specifically designed for control of the specialty printing device.

For example, in some circumstances, the specialty device driver 126*x* is connected via a universal serial bus (USB) wireline type of connection. In this circumstance, the communications device driver 126*x* is a universal serial bus (USB) device driver. This USB device driver 126*x*, is a device driver that is not required to be designed in accordance with a specific set of design characteristics of the specialty printing device 140*z*. In other words, no device driver that is specifically designed for the specialty printing device 140*z* is required to communicate with and control the specialty printing device 140*z*.

Likewise, in another circumstance, communication with an Ethernet connected specialty printing device 140*z* would simply require an Ethernet driver 126*z*. And likewise, in another circumstance, a Wi-Fi connected specialty printing device 140*z* would simply require an Wi-Fi driver. This type of arrangement unburdens the operating system 122 and its drivers 126 from being required to have device specific device drivers installed for all of its device drivers. Furthermore, it unburdens the operating system 122 from obtaining version updates for such specialty device drivers.

Figure 6:
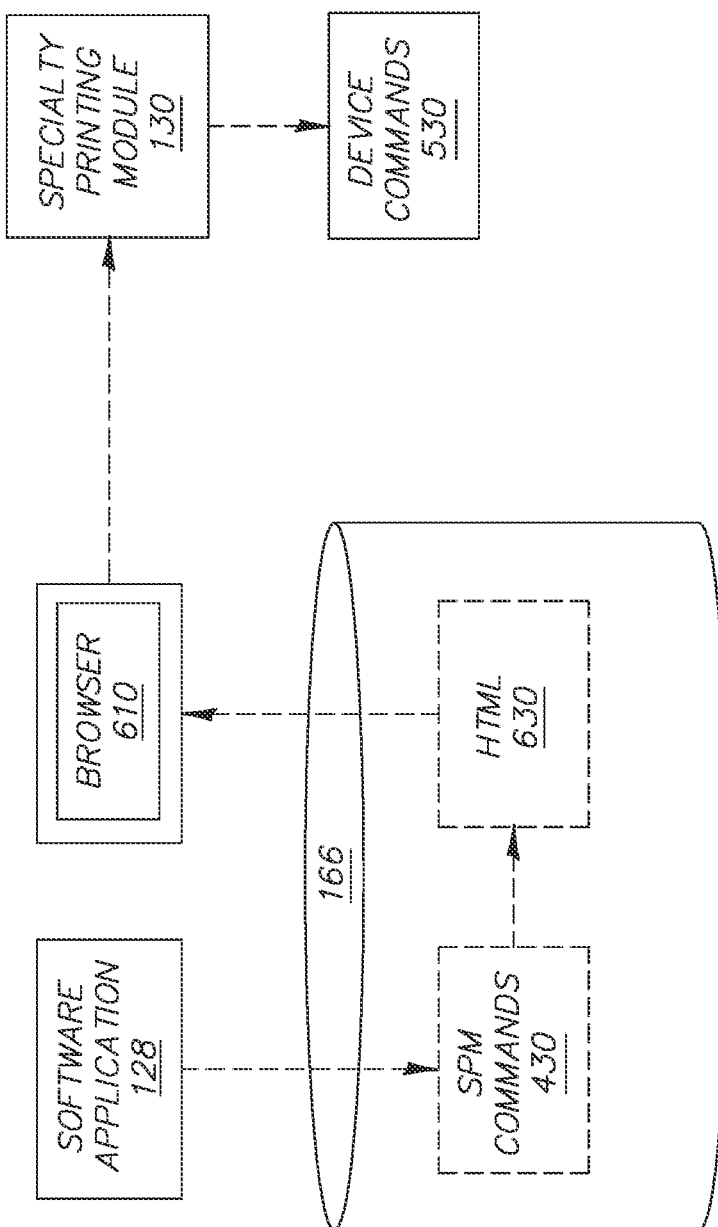
FIG. 6 illustrates a simplified representation of communication between the software application, an HTML browser and the specialty printing module.

FIG. 6 illustrates a simplified representation of communication between the software application 128, an HTML browser 610 and the specialty printing module 130. The SPM 130 in interchangeable with a specialty device module (SDM), which is also referred to herein as a specialty device interface module (SDIM). As shown, the software application 128 can store SPM commands 430 into a set of hypertext markup language (HTML) 630. The HTML 630 is input and processed by a (Internet Web) browser program 610.

The HTML 630 can direct the browser program 610 to display a list of actions to be executed at the option of a user that is interfacing with the browser program 610. Each action can be represented as text that is read by the user. Upon activation (selection) of the text by the user via a pointing device or keyboard input, for example, the browser program 610 communicates the SPM commands 430 to the specialty printing module (SPM) 130. And as described in association with FIG. 4, the SPM 130 module communicates any device specific commands 530 to the specialty printing device 140z via the operating system 122 and at least one of its device driver(s) 126x.

The SPM 130 receives and processes commands that are transmitted directly or indirectly from a software application 128. In some embodiments, the programming interface that resides in between the SPM 130 and the software application 128, is configured to enable transfer of one or more uniform resource locator (URL) addresses from the software application 128 to the SPM 130. These URL addresses can include a success URL address and a failure URL address. A success URL address is a URL address of a software component, typically the URL address of the software application 128 itself. A failure URL address may be the URL address of the software application 128 itself, or alternatively, a URL address of a software component other than the software application 128.

Upon successful completion of command processing, the SPM 130 will interact with the operating system to cause transition to execution of a software component addressed by the success URL address. Alternatively, if the command processing is unsuccessful, the SPM 130 will cause the operating system to transition to execution of a software component addressed by the failure URL address.

Optionally, the programming further enables return to the software application 128 of any data returned by the specialty printer 140x in response to its communication with the specialty printing module 130, while processing printing commands.

In some embodiments, the browser program is configured to list a specialty printer discovery action, that when selected, will search for and discover uniform resource locator (URL) addresses for each available specialty printer that resides within a particular network computing environment. Upon selecting a URL for a specialty printer, that printer can be communicated with from the software application 128 via the SPM 130.

FIG. 7 illustrates a report that is rendered (printed) onto media of a specialty printer. A report is defined to include one or more tables, while each table is defined to include one or more fields. As shown, an embodiment of a report 710 includes (3) tables 736a-736c. These tables 736a-736c can be rendered (printed) as a report that constitutes one label that is printed onto an adhesive-backed media, or rendered onto an electronic user interface display, or rendered (printed) onto a portion of a roll of journal receipt paper, for example.

Each table 736a-736c is positioned either at an absolute location within boundaries of the report 710, or positioned at a location that is relative to a location of another table that is included within the same report 710. Each table 736a-736c includes one or more fields. As shown, the table 736c includes fields 737a-737e which each appear to function as a title or label of a column of text within the report 710.

Each field 737a-737e is positioned either at an absolute location within boundaries of the table 736c, or is positioned at a location that is relative to that of a location of another field that is included within the same table 736c. Each field represents a portion of data of a report that is rendered (printed, written), for example, as text, a barcode, an image or the like.

Data of a report is divided into one or more data items. For example, a data item can be alphanumeric text that identifies a food item for sale, or alternatively could be alphanumeric text to quantify a price of a purchased food item. Each field, such as fields 748a-748e can include one or more data items. For example, field 748c can include (3) data items that are rendered and delimited by at least one comma text character. As a result, a definition of a report can vary substantially in relation to other reports, depending upon the number and types of defined tables, and upon the number and types defined fields within each defined table, and as a result, can specify a wide variety of arrangements of rendered (printed) information.

The subject matter described herein facilitates the convenience of printing a large amount of information in the form of a report, representing for example, a sales report, sales receipt, invoice, or inventory report, onto media being printed by a small portable hand held specialty printer. The media of a specialty printer is atypical, in that a specialty printer is typically not designed to print onto 8.5×11 inch sections (pages) of paper media, but instead, is typically designed to print on smaller dimensioned paper and non-paper media.

As described herein, the structure of a report is defined by a specification. A specification definition of a report defines the number and type of columns within a report, which are indicative of a horizontal width of a report, as printed. However, the specification does not limit the amount of input data received from one or more data sources that form rows within the report.

As a result, as the amount of input data within a particular report grows, the vertical length (number of rows) of the report grows. As the vertical length (number of rows) of a report grows, the printed length (vertical height) of the report grows in a direction that is parallel to a vertical dimension of media that is being printed.

For example, when printing to a roll of media via a specialty printing device, the vertical dimension of a roll of media is also the long dimension of the roll of media. Hence, a report including much data in many rows, can be printed onto the roll of media, often and typically without consuming the entire amount of available media of the roll of media to be printed.

As a result, even a large report including information listing (100) items sold, can be printed via a physically small hand held specialty printer that prints onto a roll of media. In this circumstance, each of the items sold is represented by a row of text within a table of a report being printed. Each row of text has a horizontal length (width) that fits within a horizontal width of the roll of media. However, each row of text consumes only a small portion of the roll of media along the long (vertical) dimension of that roll of media.

Consequently, a printing of a large amount of information can be conveniently performed by a relatively small, portable, and hand held specialty printer.

Specialty Devices

Optionally, the apparatus, methods and systems described above is employed to communicate and control specialty devices other than specialty printing devices. In some embodiments, a specialty device module (SPD) is substituted for the specialty printing module (SPM). The SPD is designed to communicate with and control specialty devices in the same manner as the SPM communicates with and controls specialty printers.

In some embodiments, the specialty device is a temperature measuring sensor device, also referred to herein as a temperature sensor device. The temperature sensor device is designed to measure temperature at a particular location, which is typically located away from a location of a computer executing the software application 128. The software application can query the temperature sensor device at periodic time intervals to obtain a current temperature reading of the temperature sensor, via the SDIM. In some embodiments, the temperature sensor device is a Wi-Fi temperature sensor which is designed to accurately measure temperatures between −40° C. to 85° C. This temperature sensor device is particularly suitable for monitoring changing temperatures within a facility or particular room within a facility.

More information is available at:
http://www.monnit.com/Products/Wireless-Sensors/Wi-Fi/Wi-Fi/Wireless-Temperature-Sensors In some embodiments, the specialty device is a water detector. The water detection device is designed to measure the presence of water at a location that is typically located at a particular location, which is located typically away from a location of a computer executing the software application 128. The software application can query the water detection device sensor at periodic time intervals, to obtain a current water presence reading of the water detection device, via the SDIM. In some embodiments, the water detection device is a water detection sensor device which is designed to transmit information to alert a property owner of potential property damage resulting from a water leak or flood. This type of sensor could also be employed to detect a lack of water condition, to detect if/when a supply of water is nearing or at depletion.

More information is available at:
http://www.monnit.com/Products/Wireless-Sensors/Wi-Fi/Wi-Fi/Wireless-Water-Detect-Sensors In some embodiments, the specialty device is an asset location and status monitoring device, also referred to herein as an asset locating device or asset tracking device. The asset locating device, tracks asset tags that are affixed to assets that could be potentially moved over time. In some embodiments, asset tags are designed to respond to a transmitted radio frequency identification (RFID) signal in real-time for up to the second reporting of asset location and/or status.

In some embodiments, the asset tag is supplied by Zebra Net family of products, which supplies WhereTags that are fully sealed to support operation in both indoor and outdoor environments.

More information is available at:
https://www.zebra.com/us/en/products/location-solutions/wherenet/wheretag.html The present invention also provides for a non-transitory computer-readable medium, such as a portable memory device that is encoded with computer program(s) implementing the specialty printing module and/or the specialty device module, the report builder and other file types such as a specification, a file of SPM commands and a file including HTML as described above.

The apparatus, methods and systems that are described above are also employed to communicate and control specialty devices, being devices that provide functionality in addition to and/or separate from that of specialty printing devices. In other words, specialty devices are a superset of specialty printing devices, and are not necessarily specialty printing devices.

In some embodiments, a specialty device module (SDM), also referred to herein as a specialty device interface module (SDIM), is substituted for the specialty printing module (SPM), in the same matter as described with respect to embodiments associated with specialty printing devices and the specialty printing module (SPM). In other words, the SDIM is designed to communicate with and control specialty devices in the same manner as the SPM is designed to communicate with and control specialty printers.

Figure 8:
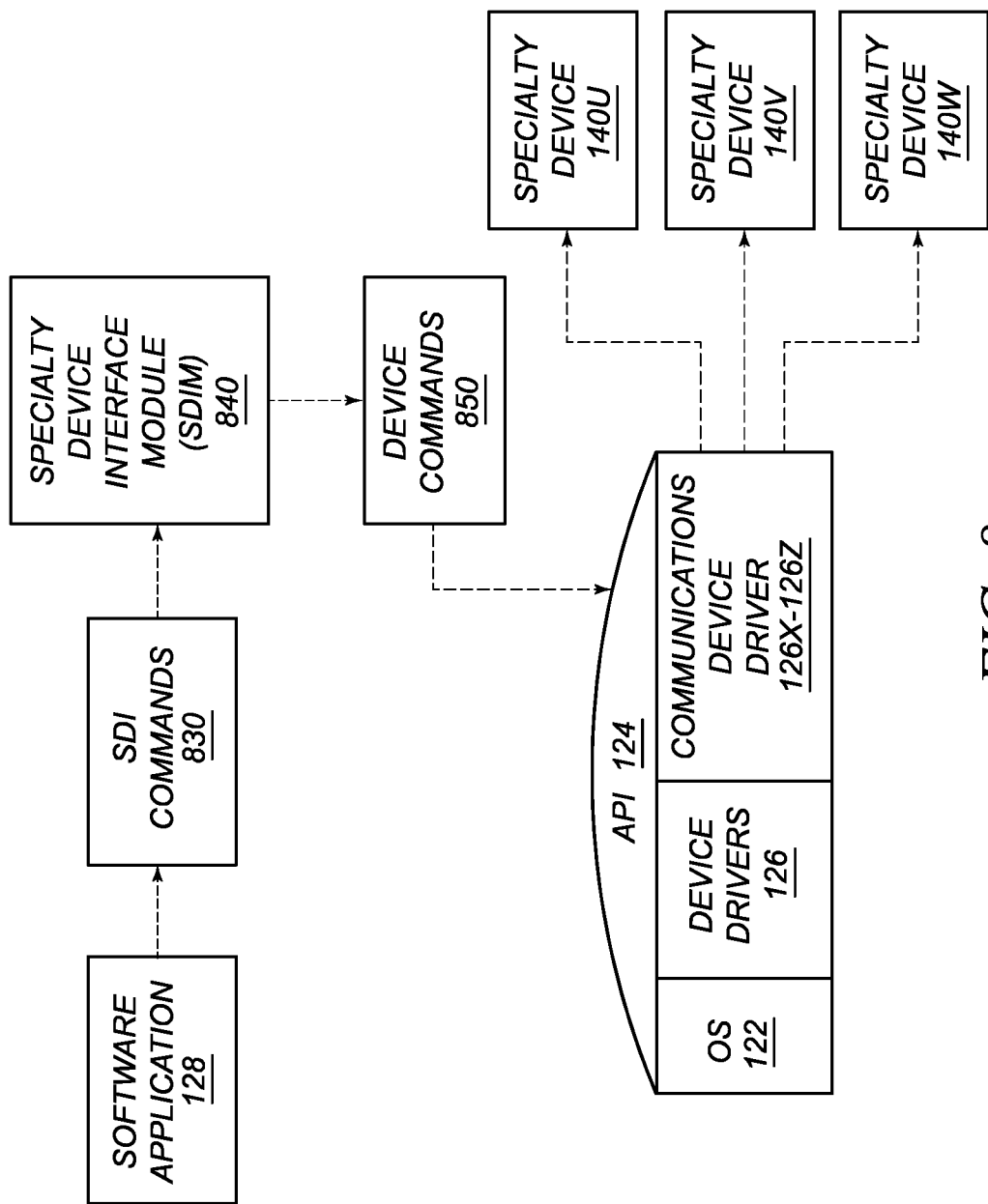
FIG. 8 illustrates a simplified representation of communication between the software application, specialty device interface module (SDIM), operating system and the specialty device.

FIG. 8 illustrates a simplified representation of communication between a software application 128, a specialty device interface module (SDIM) 840, and one or more specialty devices 140*u*-140*w* via one or more communications device driver(s) 126*x*-126*z*.

As shown, the software application 128 communicates specialty device interface (SDI) commands 830, also referred to as SDIM commands 830, to a specialty device interface module 840. The specialty device interface module 840 interfaces with an applications programming interface (API) 124 of an operating system 122, in order to communicate device specific commands 850 to one or more specialty devices 140*w*. In a pass through mode, device specific commands that are embedded into the SDI commands 830 are passed through the SDIM 840 and relayed to one or more specialty devices 140*w*.

Notice that in some circumstances, the SDIM 840 communicates the device commands 850, not necessarily through a specialty device driver 126, but instead communicates the device commands 850 via a communications device driver 126*x* to one or more specialty devices 140*u*-140*w*. One or more communications device drivers 126*x*-126Z are each designed for performing a specific type of communication, and each is not necessarily designed for specific control of a particular specialty device.

For example, in some circumstances, the specialty device driver 126*x*-126*z* is connected via a universal serial bus (USB) wireline type of connection. In this circumstance, the communications device driver 126*x* is a universal serial bus (USB) device driver. This USB device driver 126*x*, is a device driver that is not necessarily required to be designed in accordance with a specific set of design characteristics of the specialty device 140*u*-140*w*.

Likewise, in another circumstance, communication with an Ethernet connected specialty device 140*u*-140*w* would simply require an Ethernet driver 126*x*-126*z*. And likewise, in another circumstance, a Wi-Fi connected specialty device 140*u*-140*w*, could require at least a Wi-Fi device driver within the operating system 122. In other embodiments, Bluetooth communications are employed through a Bluetooth access point to interface with Bluetooth compatible specialty devices. Device drivers for communication are required for communication with such Bluetooth compatible specialty devices via a Bluetooth access point. In some circumstances, this type of arrangement can unburden the operating system 122 and its device drivers 126 from being required to include (load) device drivers designed for interfacing with specific specialty devices (specialty device drivers). Furthermore, it can unburden the operating system 122 from obtaining version updates for such specialty device drivers.

A specialty device can function as a radio frequency identification device (RFID) reader and/or encoder device, which are each respectively referred to as an RFID reader device or RFID encoder (writer) device. In some embodiments, the specialty device includes both RFID reader and RFID encoder (writer) functionality, and such a device is herein referred to as RFID reader and encoder device.

An RFID encoder device is designed to encode and store information into memory within an asset tag that is affixed to an object. The object can be, for example, an asset, such as a package that is being stored within a warehouse. Such information that is stored within the asset tag, can include information and/or various attributes associated with the object, being for example, size, volume, location and even temperature related information associated with the object to which the asset tag is affixed. Optionally, such information can also be stored into a database, that is accessible to the software application 128 and that is separate from information stored within the asset tag.

An RFID reader device is designed to access (read) information that is stored into the memory within an asset tag that is affixed to an object. Asset tags are generally designed to respond in real time when receiving a radio frequency identification (RFID) signal that is generated by an RFID reader device. The asset tag can respond to a signal transmitted by an RFID reader device, when it is located within an operational range of that particular RFID reader device. The asset tag responds by transmitting a signal that encodes information stored inside of the asset tag In accordance with some embodiments of the invention, the software application 128 can interface with multiple specialty devices, in order for the software application 128 to enable the specialty devices to interoperate and exchange information with each other.

For example, a first specialty device, being a network accessible temperature measuring device, can be employed to measure a temperature of a package containing frozen fish, while this package is located inside of a warehouse. A second specialty device, such as an RFID encoder, is employed to store the temperature information received from the first specialty device, into an asset tag that is affixed to the package of fish.

Note that optionally, other information, such as a time and a date associated with the temperature measurement, and a current location of the package within a particular warehouse, where applicable, can also be stored into the asset tag and/or into a separate data base that is accessible by the software application 128. In some embodiments, the specialty device includes both RFID reader device functionality and said RFID encoder device functionality, herein referred to as RFID reader and encoder device. Note that a barcode reader device is also referred to herein as a barcode scanning device, and a barcode printing device, is also referred to herein as a barcode encoder or as a barcode writing of barcode writer device.

In accordance with the invention, in addition to a specialty device functioning as a barcode printing device, a specialty device can function as a barcode reader device, in order to access information stored within a barcode. Such a barcode can be affixed to a package, or affixed to a tag that is affixed to a package, for example.

A barcode reader device is able to scan and decode the information encoded within in the barcode. In some embodiments, the scan method employs various imaging methods that may include projection of a beam of light, and capture of light reflecting off of a barcode, in response to the projection of the beam of light. A barcode can be imaged (printed, encoded, written) onto various media such as paper or plastic, or engraved on objects such as metals, and embedded in electronic documents, and displayed on display screens of electronic devices. In some embodiments, the specialty device includes barcode reader, RFID reader and RFID encoder functionality, in addition to barcode reader functionality.

In some use scenarios, the software application prompts a user, being a person who is interacting with the software application, to present a barcode for scanning via a specialty device that is a barcode reader. In some use scenarios, the barcode is printed or engraved onto a particular object, such as a package or product stored within a retail store or a warehouse. In some circumstances, a barcode is displayed onto a user interface screen of a smart telephone.

Note that in some use scenarios, a user interfaces with the system of the invention via a portable computer, such as via a tablet or smart phone. A table or smart phone are each conventional devices that are made and sold in large volumes. Published software is available for communication with such conventional devices, and as a result, such devices are not considered specialty devices.

In a first use scenario, the software application 128 interfaces with such non-specialty devices through conventional means of communication, and exchanges communications with (to and from) one or more users. Such communications can prompt the system to send and receive communications to and from other specialty devices. Such communications can also prompt users to operate devices, whether those devices are specialty or non-specialty devices.

In a second use scenario, embodiments of the invention can be employed as an alternative control and communication interface to such non-specialty devices. However, such a second use scenario may not be necessary, if other conventional means of communication are readily available to interface with such non-specialty devices. But in some circumstances, use of an alternative communications interface, such as that provided by embodiments of the invention, may be preferred by users and/or designers of the software application 128.

With respect to the first use scenario, for example, a user located in a warehouse, receives a shipment of packages for storage into the warehouse, the user can access a website to access the apparatus/system of the invention, enter one or more commands through a non-specialty device, such as via a tablet, and is prompted to and/or can simply proceed to scan an existing barcode from each package, and optionally RFID encode each package, while the user is using such barcode and RFID specialty devices while such devices are interfacing with the system of the invention via a network, such as via the Internet or via a private network.

In some embodiments, for example, the system of the invention interfaces with a Code Reader™ 2600 barcode reading device, and/or with a Zebra RFD8500 RFID reader device. Barcodes stored into electronic documents can be scanned via invoking a Byte Scout barcode reading software program, for example.

In an alternative embodiment, an SDIM process, like the SDIM 840 process, is implemented inside of a specialty device 140*u*-140*w*. In this circumstance, the software application 128 communicates through the operating system 122 to the SDIM that is embedded within (residing inside of) a specialty device 140*u*-140*w*. In some embodiments, the specialty device 140*u*-140*w* receives SDIM 830 commands via a communications driver 126*x*-126*z* of the operating system 122. Preferably, the specialty device 140*u*-140*w* is designed to incorporate at least one central processor unit (CPU) and an operating system to execute upon the CPU in order to accommodate execution of software programs (processes) including that of the SDIM. In some embodiments, the SDIM within the specialty device 140*u*-140*w* is addressable as a URL.

Figure 9:
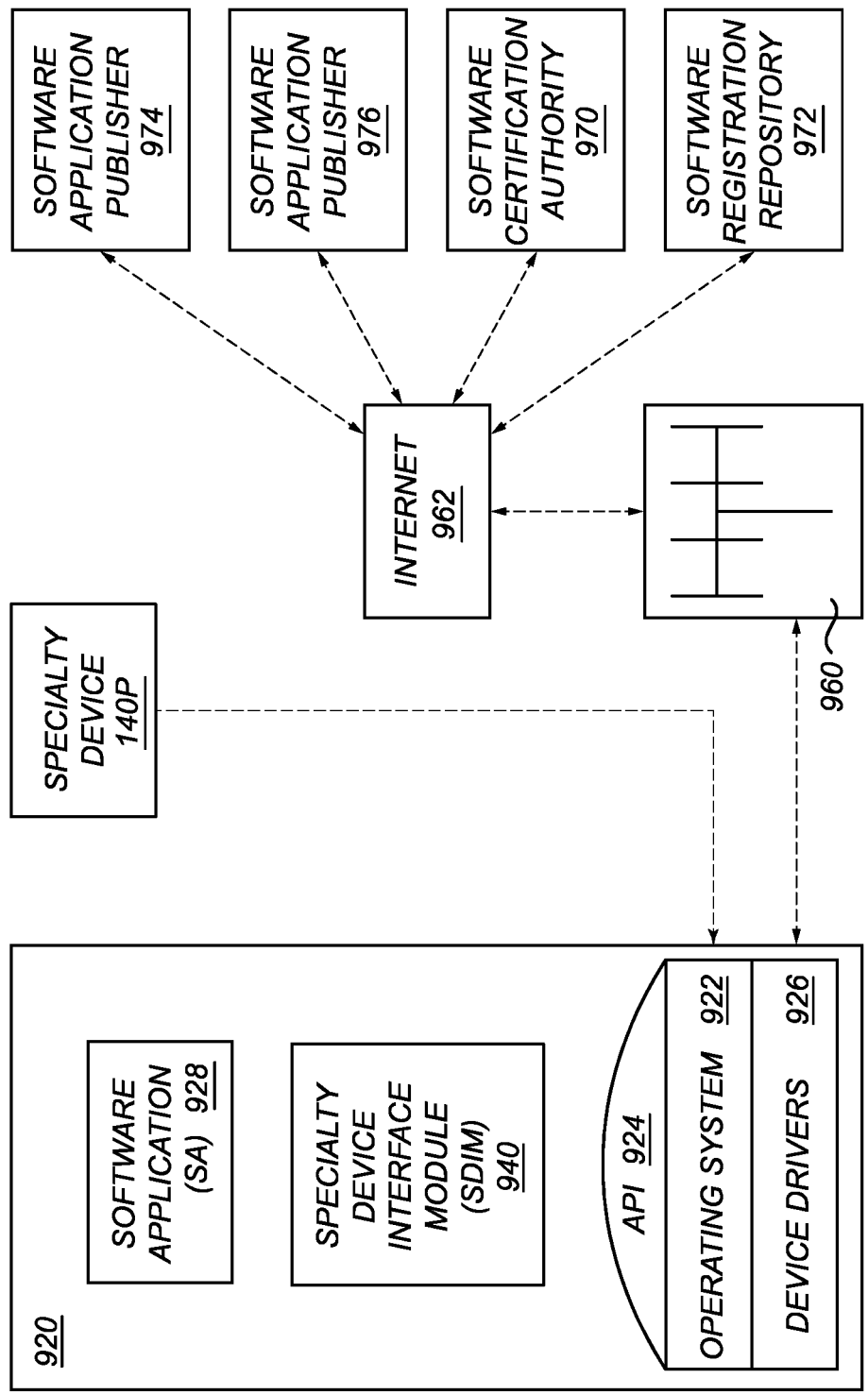
FIG. 9 illustrates a simplified representation of an embodiment of the invention providing access security to a specialty device interface module (SDIM) 940 as implemented within a mobile telephone device.

FIG. 9 illustrates a simplified representation of an embodiment of the invention providing access security to a specialty device interface module (SDIM) 940 as implemented within a mobile telephone device 920. As shown, a software application 928 and the (SDIM) 940 are executing as processes on an operating system 922 residing within a portable computer, such as a hand held computing device, and such as a mobile telephone 920.

The operating system 922 is referred to herein as a mobile telephone operating system (MTOS). The MTOS can be anyone of a variety of operating systems that are available on mobile telephones. Such operating systems include, but are not limited to, Android, iOS, Windows 10, and Blackberry for example.

Prior to executing as a process, in one embodiment, the specialty device interface module (SDIM) 940 is installed onto the mobile phone 920 via a downloading procedure. During the downloading procedure, the binary program of the SDIM 940 is communicated to the mobile phone 920 from a website of a software application publisher 974-976 that is associated with the SDIM 940, via a communications channel. Such a communications channel can be provided by a public or private network, such as for example, the Internet network. The mobile phone device 920 can communicate with the Internet via a wireless local area network (Wi-Fi) connection, a wireless connection to a mobile (cell) phone tower 960, or via a wireline connection to a nearby computer having a connection to the Internet network 962.

Likewise, prior to executing as a process, the software application 928 is installed onto the mobile phone 920 via a downloading procedure, in the same manner as described for the SDIM 940. In this scenario, the software application publisher 974 is the publisher of the software application 928, and software application publisher 976 is the publisher of the software device interface module (SDIM) 940.

Like earlier described embodiments, the software application 928 attempts to initiate communication with the SDIM 940. However, unlike earlier described embodiments, the services provided by the SDIM 940 are not available to any software application 922, but are instead conditionally available based upon a content of information identifying the software application, that is provided by the software application 928 to the SDIM 940, as part of a request for one or more services.

The SDIM 940 receives the identifying information from the software application. The identifying information is designed to uniquely identify the software application, in terms of a software application publisher of the software application, a title and version of the software application, and preferably a representation of a binary content of the software program that embodies of the software application. The SDIM 940 processes the identifying information and preferably authenticates (verifies the authenticity of) the identity of the software application, to complete a first confirmation of the identity of the software application.

In some embodiments, authentication of identifying information can be employed via employment of public key infrastructure (PKI) associated public/private encryption key pairs, where for example, a private encryption key is employed to encrypt a set of identifying information, and a public encryption key, that corresponds to the private encryption key of a public/private encryption key pair, is employed to decrypt the set of identifying information previously encrypted by the private encryption key.

Next, the SDIM 940 performs a second confirmation that includes access to content of a software registration repository (SRR) 972 to verify that the identity of the software application is registered (permitted) to request and to receive services of the SDIM 940. The SRR 972 stores information, preferably in the form of individual records, where each record represents an identity of each of one or more software applications that are each registered (permitted) to receive services from and interoperate with the SDIM 940.

Preferably, each record identifies a software application publisher 974-976, and preferably a representation of binary content of the software program of the software application, the associated software application publisher 974-976, and if applicable, a set of versions of the program that are currently permitted to request services of the SDIM 940. In some embodiments, each record may further include SDIM service subscription information that further identifies a start date and an end date, of a period of time associated with a subscription of use for the software application 928, where the subscription permits the software application 928 to request services of the SDIM 940. If services are currently permitted, the subscription is said to be currently active. If services are not currently permitted, the subscription is said to be currently inactive.

Preferably, and in some embodiments, each record identifies a program via a digital certificate (DC). The digital certificate is provided by a software certification authority (SCA) 970, which is also referred as a certificate authority (CA). The SCA 970 is a trusted entity, and acts as a third party relative to the publisher 976 of the SDIM 940 (being a first party) and relative to the publisher 974 of the software application (928) (being a second party).

Preferably, the SCA 970 employs a public key infrastructure, to create a digital certificate that identifies the publisher of a particular software application, and preferably identifies a particular software application itself (title and version), a representation of at least some of its binary content and identifies a type of central processing unit (CPU) and a type of operating system that the software application is designed to interoperate with (execute upon), and preferably further identifies a version of a binary software program that embodies the software application.

A particular software application is embodied by a binary software program that is designed (compiled) to interoperate with (execute upon) a particular central processing unit (CPU), also referred to herein as a processor, and a particular operating system (OS). The binary software program is defined by a series of binary values that are stored within it.

In some embodiments, the binary values of the binary software program, in whole or in part, are hashed via a hashing algorithm. The output of the hashing algorithm can function as a representation of the binary content of the software program of the software application. The output of the hashing algorithm can be further encrypted via employment of a particular cryptographic key, in order to uniquely identify the particular binary software program. The cryptographic key can be a private key owned by the SCA 970. In some embodiments, the private key is selected from a public and private key pair that is obtained from the public key infrastructure (PKI).

The SCA 970 preferably encrypts an output (hash value) of the hashing algorithm and further encrypts other information that is associated with the software application and its publisher, via the private cryptographic key. The digital certificate stores some or all of the aforementioned information in a form that is encrypted with the private cryptographic key. Some or all of such encrypted information can be stored inside of a record within the software registration repository (SRR) 972.

The SDIM 940 compares the identifying information received from the software application (SA) 928 with a record from the SRR 972 having a currently active subscription, and if there is a match, then the SA 928 is permitted to request services from the SDIM 940. Else, if there is no match, then the SA 928 is not permitted to request services from the SDIM 940.

If the SA 928 is currently permitted to request services, then the SDIM 950 communicates with one or more specialty devices, preferably via wireless communication between the mobile phone 920 and a specialty device 140*p*.

Such wireless communication can be implemented via the Bluetooth protocol, or other wireless protocols, for example.

A Sample Application

In one scenario, a police officer employs a mobile phone 920. The SDIM 940 and a particular traffic violation software application (TVSA) 928 are each installed onto the mobile phone 920. The TVSA 928 enables the police officer to access services of a traffic violation website, that is accessible via the Internet or other network, to verify proper vehicle registration of a suspected traffic violator, and if necessary, to generate a traffic violation ticket, also referred to as a traffic citation.

The TVSA 928 can also request services from the SDIM 940 in order to print a traffic violation ticket (traffic citation) via a specialty printer 140. The specialty printer 140 can be located inside of a police vehicle. The SDIM 940 executing within the mobile phone 920, communicates with the specialty printer 140p via the Bluetooth communications protocol. The above scenario is just one example of how the above described mobile phone embodiment can be employed.

In an alternative embodiment, the SDIM 840 in implemented inside of a specialty device 140u-140w. In this circumstance, the software application 128 communicates through the operating system 122 to the SDIM 840 that is embedded within (residing inside of) a specialty device 140u-140w. In some embodiments, the specialty device 140u-140w receives SDIM 830 commands via a communications driver 126x-126z of the operating system 122. Preferably, the specialty device 140u-140w is designed to incorporate at least one central processor unit (CPU) and an operating system to execute upon the CPU in order to accommodate execution of software programs including the SDIM 840. In some embodiments, the SDIM 840 is addressable as a URL.

In an alternative embodiment, an SDIM process, like the SDIM 940 process, is implemented inside of a specialty device 140p. In this circumstance, the software application 928 communicates through the operating system 922 to the SDIM that is embedded within (residing inside of) the specialty device 140p. In some embodiments, the specialty device 140p receives SDIM commands via a communications driver 926 of the operating system 922. Preferably, the specialty device 140p is designed to incorporate at least one central processor unit (CPU) and an operating system to execute upon the CPU in order to accommodate execution of software programs (processes) including that of the SDIM. In some embodiments, the SDIM that is embedded within the specialty device 140p is addressable as a URL.

Figure 10A:
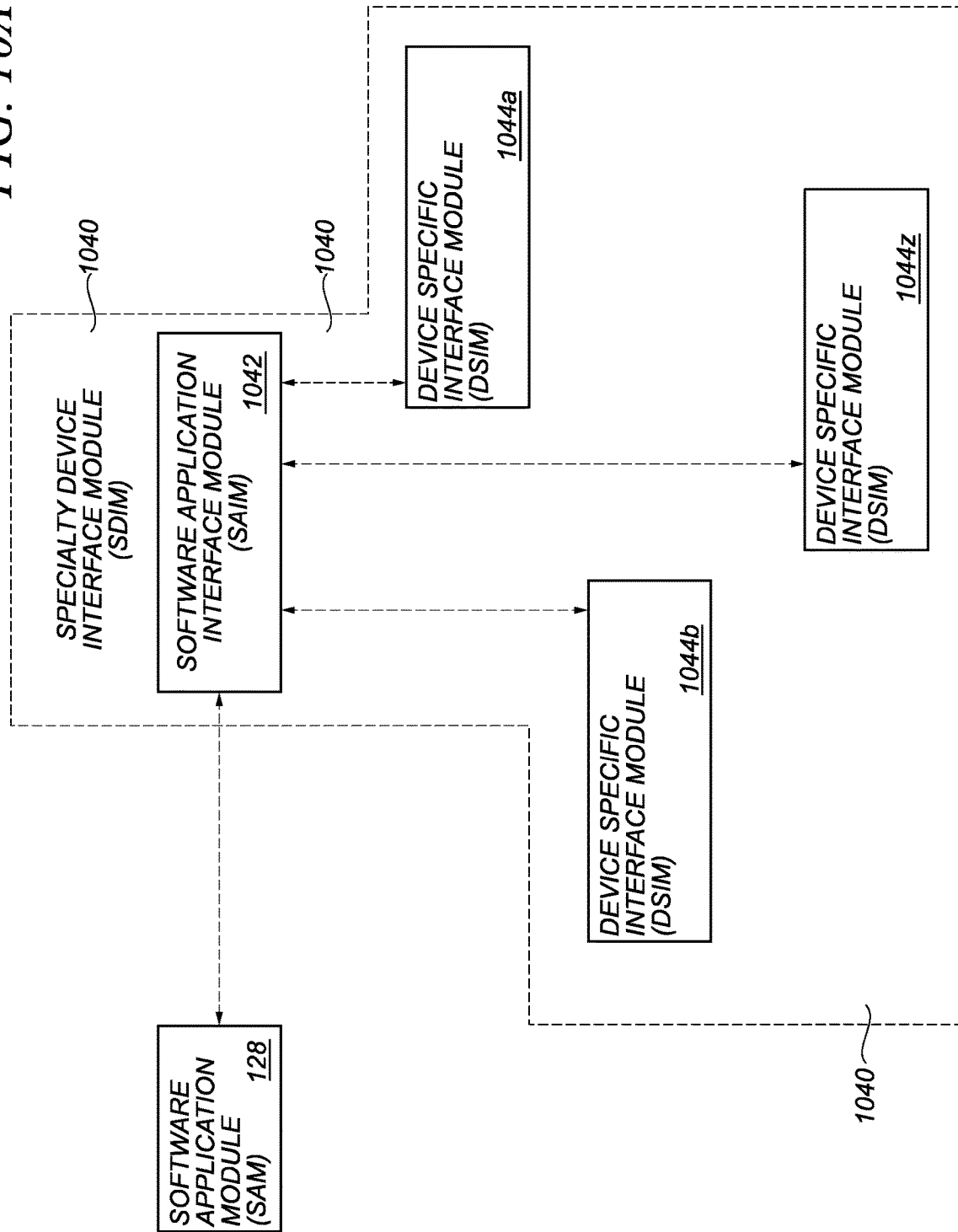
FIGS. 10A-10B illustrate a simplified representation of an embodiment of the invention that includes a specialty device interface module (DSIM) 1040 that is divided into a set of multiple and separate software modules.
Figure 10B:
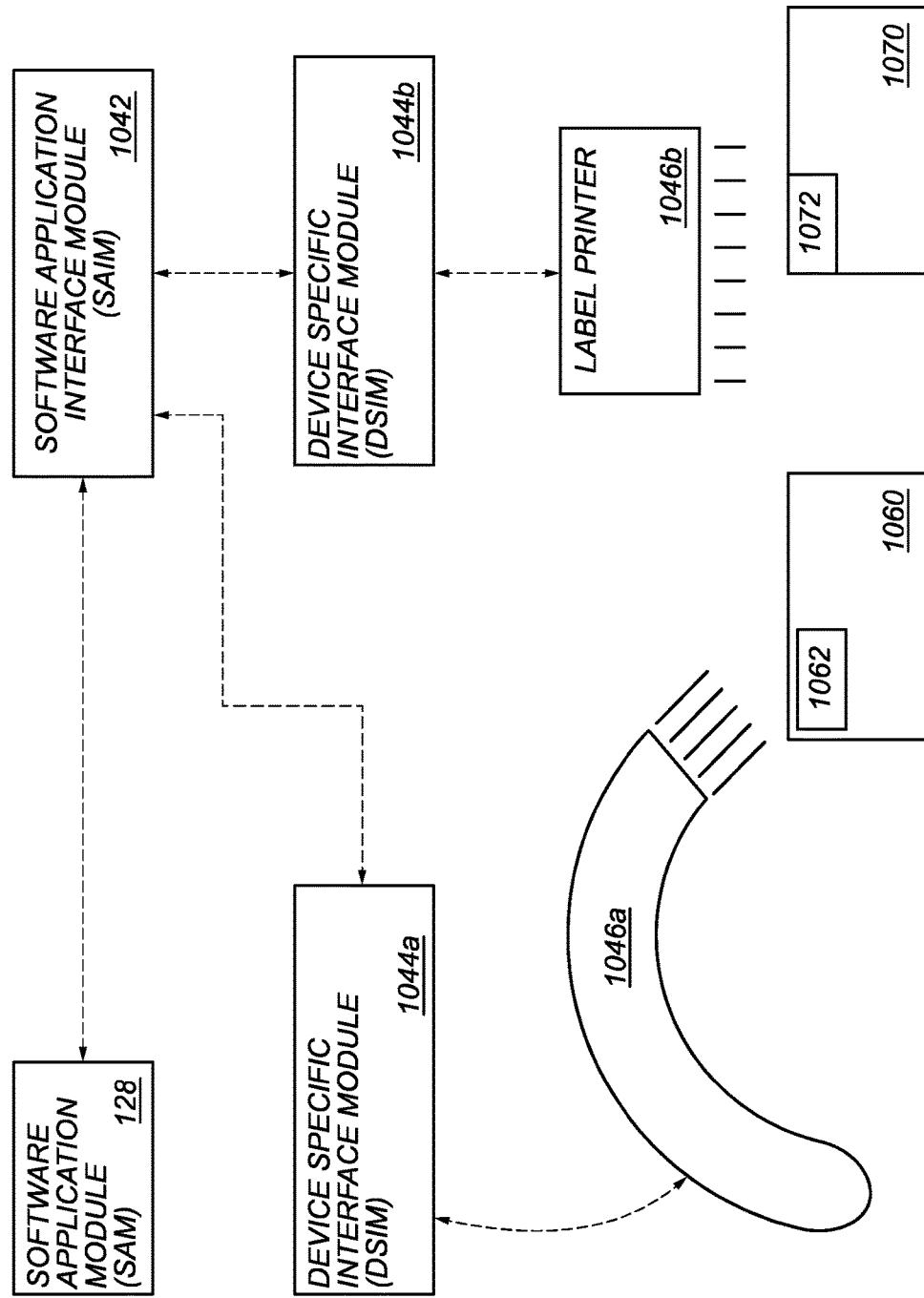

FIGS. 10A-10B illustrate a simplified representation of an embodiment of the invention that includes a specialty device interface module (SDIM) 1040 that is divided into a set of multiple and separate software modules. This set of software modules, each of which is also referred to herein as modules or sub-modules, includes a software application interface module (SAIM) 1042 and a plurality (set) of one or more device specific interface modules (DSIM) 1044a-1044x.

Referring to FIG. 10A, at least one software application module (SAM) 128 interfaces (communicates) with the software application interface module (SAIM) 1042 in the same manner as if it were the specialty device interface module (SDIM) 840 of FIG. 8 or 940 of FIG. 9, for example. In other words, the SAIM 1042 of FIG. 10A provides an application programming interface (API) to at least one instance of a software application (SAM) 128, in a manner like that described for and provided by the specialty device interface module (SDIM) 840 of FIGS. 8 and/or 940 of FIG. 9.

The SAIM 1042 is designed to interface (communicate) with one or more executing instances of the software application module (SAM) 128 module, where such executing instances of the SAM 128 are typically each distributed over a wide area network, such as over a communications network 150 like that described in association with FIG. 3.

Each device specific interface module (DSIM) 1044a-1044x is designed to interface (communicate) with an executing instance of the SAIM 1042 and further designed to interface (communicate) with one or more devices, where these devices 1046a-1046x typically include specialty devices. Also, each device 1046a-1046x is designed to interface (communicate) with an associated device specific interface module (DSIM) 1044a-1044x. In other words, the DSIM 1044 is designed to function as an intermediary between an executing process like the SAIM 1042 and one or more devices 1046.

A set of one or more device specific interface modules (DSIM) 1044a-1044x can reside (execute) upon one same computer (computing platform), or instead be geographically distributed into separate sub-groups, where each of these sub-groups includes one or more DSIM modules 1044a-1044x, and where each sub-group resides (executes) upon a separate computer (computing platform). These separate computers can be geographically distributed away from each other or located proximate to each other.

Also, each of the DSIM modules 1044a-1044x can reside (execute) upon the same or different computer relative to a computer (computing platform) upon which other software, such as for example, the software application module (SAM) 128 and/or the software application interface module (SAIM) 1042 resides (executes). Preferably, the aforementioned computers (computing platforms) are configured to communicate with each other via a network, including such as like the network 150.

Preferably, each module, whether it be a software application module (SAM) 128, a software application interface module (SAIM) 1042 or a device specific interface module (DSIM) 1044a-1044x, and further, each specialty device 1046a-1046x, is assigned a unique, address, such as a unique uniform resource locator (URL) address, so that these modules and these specialty devices are communication accessible with each other via a network, such as the Internet network.

The software application (SAM) 128 is designed to provide a menu (set/list) of command options to a user, where each command option is also referred to herein as a request for an operation, which is also referred to herein as a request for an action. Each operation (action) is also referred to herein as an application type, application name or as an application. This set of command options preferably includes a request for a price lookup action, a label printing action, inventory verification action, an inventory picking (inventory reduction/item removal) action, inventory addition (item addition), inventory update (item check/verify) action, a shipping action and a receiving action, and various inventory query requests to ascertain what items, and in what amounts, and at what locations, are currently recorded as being stored within the inventory of the system.

A user interface provided by the system to the user enables the use to select applications and parameters associated with those applications. The user can select a parameter via a mouse selection, or enter parameters into system by a keyboard or mouse. Such parameters include identification of individual devices, such as the identification of a specific barcode scanner, or of a particular label printer, for example.

The software application interface module (SAIM) 1042 is designed to coordinate performance of the aforementioned operations/actions requested by at least one user via a software application module (SAM) 128. Each requested operation (action) is characterized as having a set of associated parameters, also referred to as attributes or elements of the operation (action) being requested.

For example, each operation (action) is at associated with at least one executing instance of a software application module (SAM) 128 from which the request is communicated. This request is associated with a computer (computing platform/computing device), also referred to herein as a host computer, being a computer upon which the software application module (SAM) 128 resides (executes). This request is also associated with an identification of a user interacting with the user interface (front end) of the (SAM) 128. This request is also associated with one or more devices that are to perform the operation (action).

A user invokes an operation (action) by interacting (communicating) with the user interface (front end) of the SAM 128 as it is executing on a host computer (computing platform/computing device). While invoking the operation (action), the user selects a particular operation (action) to be performed, and selects one or more devices to associate with and participate with the performance of the requested operation (action) and selects any other attributes (parameters) that may apply to the operation (action) being requested for the system of the invention to perform.

The identification of a user, can be implemented via an email address, and/or via a system assigned (registered) name or certificate. Each of the (specialty) devices that perform the requested operation (action) can be identified by a serial number, by a system assigned name, by an assigned internet protocol (IP) address, an Ethernet MAC address, a Bluetooth address, and/or identified via a unique system assigned identification number.

The host computer (device) can be identified by a manufacturer assigned serial number, by system assigned name, and/or by internet protocol (IP) address assigned to the host computer. In some embodiments, a software application module (SAM) is identified by the host computer upon which it executes (resides) and/or by an executing process instance identifier supplied by the operating system upon which it executes (resides).

Preferably, each module and sub-module, is assigned a uniform resource locator (URL) address that is utilized to facilitate network communication, such as Internet network communication, between modules and sub-modules. Further, such communication can be further facilitated via employment of a wireless communication network such as Wi-Fi, Bluetooth, near field communication (NFC), cellular telephone network, and/or via a wireline communication network such as Ethernet and/or universal serial bus wireline connection(s), for example.

Referring to FIG. 10B, the device specific interface module (DSIM) 1044*a* interfaces (communicates) with a barcode scanning device 1046*a*, which is also referred to herein as a barcode scanner 1046*a*. The barcode scanner 1046*a*, is designed to scan a barcode 1062. The barcode 1062 is a symbol that is printed (printed symbol) that is disposed onto an outer surface of a package 1060 that encloses a product. Typically, the product and its enclosing package are together stored as items within inventory. Such items are tracked and managed in accordance with the system of the invention.

A second device specific interface module (DSIM) 1044*b*, interfaces (communicates) with a label printing device 1046*b*. As shown, the label printing device 1046*b*, which is also referred to herein as a label printer 1046*b*, prints a label 1072 upon label media 1070. The label media 1070 is preferably designed to have a backing surface that is designed to be adhered to an outer surface of a package, such as for example, the outer surface of the package 1060.

As described earlier, in some embodiments, a unit of label media can include an RFID transponder, and "printing" of such a unit of label media causes information to by stored into the RFID transponder, within that unit of label media. The label can include a barcode symbol, where printing of the barcode symbol also causes information to be stored into the barcode symbol, also within that unit of label media.

Note that each device specific interface module (DSIM) 1044, functions like a device driver that resides (executes) outside of an operating system kernel. The DSIM 1044 is a software process (executing program) residing and executing outside of an operating kernel of a computer (computing platform), and is designed to interface with a device (specialty device) via that same operating system kernel, and further, the DSIM 1044 is designed to communicate with another software process (executing program), such as the software application interface module (SAIM) 1042 for example, also residing (executing) outside an operating system kernel, and which can be residing (executing) upon the same computer or upon a different computer, upon which the DSIM 1044 executes.

Also, each DSIM 1044 provides an applications programming interface (API) to the aforementioned (another) software process (executing program), such as the software application interface module (SAIM) 1042, for example. This API of the DSIM 1044, which is also referred to herein as a DSIM API, is designed to shield the SAIM 1042 from performing particular actions associated with the command and control of a specific (specialty) device for which the DSIM 1044 is designed to interface with.

This DSIM API includes functionality for determining device discovery and for determining the device availability of a (specialty) device for use, for connecting to (engaging) the (specialty) device for its available use within the scope of an operation, such as a user requested operation, and for sending data to and receiving data from the (specialty) device, queueing messages to and from the specialty device, and for dis-connecting (dis-engaging) the (specialty) device upon completing use of the (specialty) device.

The DSIM 1044 is designed to significantly reduce the complexity of software within the aforementioned (another) software application, such as the SAIM 1042, that is configured (expected) to interface with and interoperate with a particular (specialty) device, and further, is designed to reduce the complexity of the software application (SAIM 1042) that is expected to interoperate with and coordinate interoperation between a variety (plurality) of devices, including such as specialty devices.

The DSIM 1044 can be designed to accommodate a variety of types of specialty devices, such as a radio frequency identification (RFID) writer (encoder) to write (encode) an RFID tag, or an RFID reader (decoder) to read (decode) a RFID tag, an asset location tracking (monitoring) device, a temperature sensor (monitoring) device, or a near field communication (NFC) device to read an NFC tag, just for example.

FIG. 11A illustrates a simplified representation of communication between the software application interface module (SAIM) 1042, a device specific interface module (DSIM)

1044*x* and a device 1046*x*. The SAIM 1042 executes as a process that interoperates with an operating system 1122*b*. The operating system 1122*b* including a set of device drivers 1026 and providing an applications programming interface (API) 1024 to the SAIM 1042.

As shown, the device specific interface module (DSIM) 1044*x* resides and executes upon an operating system 1122*c*, and interfaces with a device, being a specialty device 1046, via that operating system 1122*c*. The operating system 1122*c* includes a device driver 1126*x* which is designed to provide an applications programming interface (API), to the DSIM 1044*x*, for the purpose of controlling the operation of the device 1046*x*.

In this circumstance, the operating system 1122*c* is said to have a local (direct) communication connection to the device 1046*x*. Likewise, the DSIM 1044*x* is also said to have a local (direct) communication connection to the device 1046*x*, via the operating system 1022*c*.

Also, in this circumstance, the DSIM 1044*x* provides a non-local (indirect) and remote communication connection between the SAIM 1042 and the device 1046*x*. This characterization of the non-local (indirect) and remote communication connection is in relation to that of software, such as the SAIM 1042, which is residing (executing) on a computer other than computer 130, and also in relation to the SAM 128, which communicates with the SAIM 1042, wherever it may be residing (executing).

Essentially, the DSIM 1044*x* is an intermediary that functions like a remote device driver for the purpose of enabling the SAIM 1042 or another remote process, to communicate with and control operation of the specialty device 1046*x*. As a result, the DSIM 1044*x* enables the system of the invention to reach out far and wide to users of the system and to devices controlled by the system.

Figure 11B:
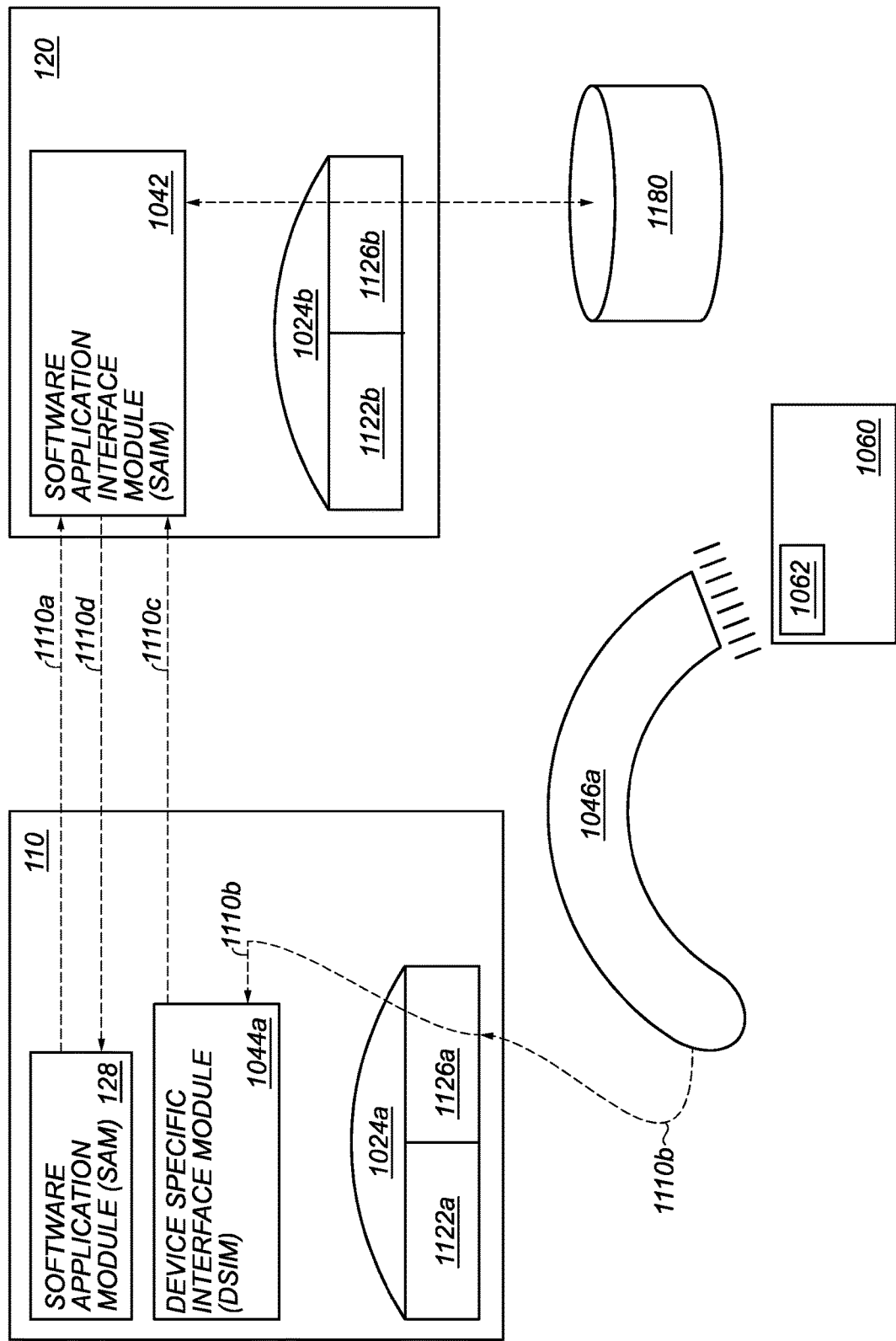

FIG. 11B illustrates a simplified representation of an embodiment of the invention where the software application interface module (SAIM) 1042 is employed to coordinate a price lookup operation.

A first user (not shown) communicates (enters) a request (command) to a first computer 110 to initiate a price lookup operation. This price lookup operation determines a current sales price for a product that is stored within the inventory. In this embodiment, the price lookup operation is intended to be associated with information to be provided by a barcode scanning operation, that is to be performed by a particular barcode scanning device 1046*a*, which is also referred to as the barcode scanner 1046*a*, and which is a type of specialty device.

In this circumstance, a user of the first computer 110, communicates (interfaces) with the software application module (SAM) 128 via a screen pointing device (mouse) and via a user interface screen that are each incorporated into and function as part of the first computer 110, in order to communicate the price lookup request (command) to the first computer 110.

In response, the software application module (SAM) 128 which is residing (executing) on the first computer 110, transmits a first communication 1110*a* at a first point in time, to the software application interface module (SAIM) 1042, which is residing (executing) upon a second computer 120. The first communication 1110*a* includes a request for the SAIM 1042 to initiate coordination of a price lookup operation in association with a specific (particular) device, being the barcode scanning device 1046*a*.

In response to receiving the first communication 1110*a*, the SAIM 1042 initiates coordination of the price lookup operation in association with a specific device, being the barcode scanner 1046*a*, as opposed to any other barcode scanner device known to the SAIM 1042. The particular barcode scanner device 1046*a*, has associated device identification information, being at least one unique digital value constituting a unique identity of the device 1046*a*.

The device identification information can include a device manufacturer assigned serial-number for the device, an identifier for the manufacturer of the device, and/or a communications address that is assigned to the particular device. For example, if a device communicates via the Bluetooth communications protocol, then its device identification information can include its Bluetooth communications protocol address.

Also, if the device communicates via the Internet protocol (IP), than its device identification can include its Internet communications protocol (IP) address, for example. Such device identification information is employed to uniquely identify each device associated with the system, and enable a user listing of devices associated with the system to a user of the system, and/or enable selection of a particular device by a user of the system. The device identification information, is also referred to herein as the device identification or device identity.

At a second point in time, shortly after the transmission of the first communication 1110*a*, a user and not necessarily the first user, operates and causes the same bar code scanner 1046*a* to scan a barcode 1062 that is disposed onto an outer surface of product packaging 1060. The barcode scanning operation causes the barcode scanner 1046*a* to transmit a second communication 1110*b* to a particular device specific interface module (DSIM) 1044*a*. This particular device specific interface module (DSIM) 1044*a* being assigned to interface at least with the barcode scanner 1046*a*.

In this circumstance, the barcode scanner device 1046*a* has a communications connection, to the first computer 110, which is a desktop computer 110, for example. This first computer 110 is the same computer upon which the software application module (SAM) 128 and the device specific interface module DSIM 1044*a*, each reside (execute) upon.

Note that this communications connection is not necessarily a local (line of sight) connection to the first computer 110, and instead can be a communications connection that spans between different rooms within a building, that spans between different floors within a building, or that spans between separate buildings, for example. This communications connection can be a wireline or a wireless type of communications connection. Optionally and preferably, and for convenience, this communication connection spans within a local, line of sight distance, between two the end points of communication, being the first computer 110 and the barcode scanner device 1046*a*.

For this example use scenario, the barcode scanner 1046*a* communicates with the first computer 110 via a point to point communications channel, such as via wireline or a wireless communications channel (connection) to the first computer 110. If as a wireline connection, this point to point connection is preferably a universal serial bus (USB) connection between the barcode scanning device 1046*a* to the first computer 110. If as a wireless connection, this connection is preferably implemented via Wi-Fi or Bluetooth technology, for example.

The second communication 1110*b*, being transmitted from the barcode scanner 1046*a*, includes (carries) a digital representation of information that is encoded within the barcode 1062, where this information is also referred to herein as the information content of the barcode 1062.

In response to receiving the second communication 1110*b*, the DSIM 1044*a* then transmits a third communication 1110*c* at a third point in time, to the software application interface module (SAIM) 1042, residing on the second computer 120, preferably via a communications network. The third communication 1110*c* includes the device identification information, representing the unique identity of the barcode scanning device 1046*a*, and further includes the information content of the barcode 1062.

In response to receiving the third communication 1110*c*, the SAIM 1042 compares and matches the device identification information included within the third communication 1110*c*, with the device identification information included within the first communication 1110*a* (price lookup request) that was previously received by the SAIM 1042 from the software application (SA) 128, and the SAIM 1042 determines that a price lookup operation is in process (ongoing) and determines that this operation is in association with the particular barcode scanning device 1046*a*.

The SAIM 1042 also matches the information content of the barcode 1052 with product information that is stored within a product (item) inventory database 1180, to obtain the product information that is associated with the information content of the barcode 1062 and that is associated with the product that the barcode represents, as part of the price lookup operation. The product (item) information obtained from the database 1180 includes a product identifier and a sales price that is currently being charged for purchase of one unit of the product that is associated with the barcode 1062 and the product identifier.

In some embodiments, the database 1180 is implemented and managed internal to the owner of the system of the invention. Alternatively, the database 1180 is implemented as a cloud provided service. For example, the database can be implemented via Fresh Books, being an online accounting service that can be accessed via a uniform resource locator (URL). Such a URL can be expressed as https://www.centid.com/myapp/fbt, for access by the system of the invention, for example.

The database 1180 provides information regarding a product (item), and optionally other information associated with to the product (item). Being that Fresh Books is an online accounting service, such a database 1180 can further provide information regarding account information associated with a buyer or seller of the product (item), and associated information, including invoice history, sales and purchase history, special arrangements with sellers and/or buyers associated with the product (item).

Optionally, the product information can also include discount sales pricing applicable to the purchase of multiple units of the product. The SAIM 1042 then transmits at a fourth point in time, a fourth communication 1110*d*, including the aforementioned sales price information, to the software application (SA) 128 residing (executing) on the first computer 110.

In response, the software application module (SAM) 128 executing upon the first computer 110, receives the fourth communication 1110*d* from the SAIM 1042, and displays product information including the sales price information for the product, resulting from the price lookup operation, preferably onto the user interface display of the first computer 110. Preferably, the product information includes a textual representation of a product (item) name, a product description and at least a one unit sales price value for that product.

Optionally, additional information, such as for example, a stylized trademark symbol for the product, is also displayed to the user. Preferably, the software application module (SAM) 128 displays the product information in a format that includes (lists) further request (command) invocation options, such as for example, an option to print a label for the product that is associated with the barcode 1062 being scanned for the price lookup operation.

The aforementioned communications 1110*a*-1110*d* are communicated over a period of time in the aforementioned order within one or more communications channels. These communications channels can include a combination of wireline and/or wireless communications links.

Alternatively, in other circumstances, the software application module (SAM) 128 is residing on a computer (computing platform) that is a more portable type of computer in comparison to a desktop computer. A portable type of computer, for example including but not limited to such as a laptop computer, tablet computer or mobile telephone. Regardless of the type of computer, the user interface display is preferably a graphical user interface display screen provided by the computer, if applicable.

FIG. 11C illustrates a simplified representation of an embodiment of the invention where the software application interface module (SAIM) 1042 is employed to coordinate a label printing operation. Referring back to FIG. 11A, as a result of the product price lookup operation, the user interface screen of the first computer 110 displays and lists a request (command) entry option for selecting (executing) a label printing operation in association with the product information that is currently being displayed on the user interface screen of the first computer 110. The aforementioned displayed information being preferably displayed in response to the completion of the price lookup operation. Preferably, this command entry option is implemented as a user interface display button for printing a label, that is selected (activated) via a mouse button selection (click).

The first user (not shown) communicates (enters) a label printing request (command) to the first computer 110 to initiate a label printing operation. This label printing operation is intended to be associated with the product information, being the displayed results of the just completed price lookup operation of FIG. 11A. In this circumstance, a user of the first computer 110, interfaces with the software application (SA) 128 via a screen pointing device (mouse) and a user interface screen that is incorporated as a portion of the first computer 110, to communicate the label printing request (command) to the SAIM 1042, preferably by selecting a button that is displayed on the user interface screen.

In response, the software application module (SAM) 128 residing (executing) on the first computer 110, transmits a fifth communication 1110*e* at a fifth point in time, to the software application interface module (SAIM) 1042, which is residing (executing) upon the second computer 120. The fifth communication 1110*e* includes a request for the SAIM 1042 to initiate coordination of a label printing operation. The fifth communication 1110*e* preferably includes information referencing and/or constituting the information content of the label 1072 to be printed.

In response to receiving the fifth communication 1110*e*, the SAIM 1042 initiates coordination of the label printing operation in association with a specific device (1048), being the label printing device (label printer) 1048, this device 1048 being identified as a parameter of this label printing operation, and this device being a type of specialty device 1048. The particular label printing device 1048 has associated device identification information, being at least one unique digital value constituting the identity of the device 1048.

In this circumstance, the label printing device 1048 has a communication connection to a third computer 130, which is a desktop computer, just for example. The label printing device 1048 preferably, but not necessarily having a point to point communication connection to the third computer 130. A device specific interface module (DSIM) 1044c, resides (executes) upon this third computer 130. For convenience, this third computer 130 is preferably located nearby to the first computer 110. Note that there is no requirement for a computer to be a desktop computer. For example, a computer can be a server computer that is accessible via the Internet.

At a sixth point in time, shortly after receiving the transmission of the fifth communication 1110e, the SAIM 1042 transmits a sixth communication 1110f to the device specific interface module (DSIM) 1046c, residing upon the third computer 130. The sixth communication including the information content of the label 1072 to be printed.

In response to receiving the sixth communication, the DSIM 1046c transmits a seventh communication 1110g to the label printing device 1048, at a seventh point in time. The seventh communication 1110g including the information content of the label 1072 to be printed. The label printer device 1048 then proceeds to print a label 1072, where the printing of the label includes the actions of printing of the information content of the label 1072.

In response to receiving the seventh communication 1110g, the label printing device 1048 either proceeds to print a label 1072 onto label media 1070, or else determines that it 1048 is unable to print a label 1072 onto the label media. If able to print the label 1072, the label printing device 10468 transmits an eighth communication 1110h, at an eighth point in time, back to the DSIM 1044c, including an acknowledgment of the completion of the label printing operation. An acknowledgment is also referred to herein as an "ack".

However, in circumstances where a label cannot be printed, for example when the label printing device 1048 is lacking label media and/or lacking ink, the eighth communication 1110h is a negative acknowledgment, also referred to herein as a "nack", indicating that the label was not printed. The eighth communication is relayed from the DSIM 1046c to the SAIM 1042 as a ninth communication 1110i, and further relayed from the SAIM 1042 back to the SA 128 as a tenth communication 1110j, and communicated to a user of the of the software application module (SAM) 128 via the user interface of the first computer 110, where the request for label printing originated and upon which the software application (SAM) 128 resides.

Alternatively and optionally, in response to receiving the fifth communication 1110e, the software application interface module (SAIM) 1042, can access the product inventory database 1180, while employing the product information obtained from the fifth communication 1110e, as a query directed towards the database 1180, to obtain additional information from the database 1180, to be included as part of the label 1072 to be printed. Such additional information can be a graphical representation of a trademark that is associated with the product and/or associated with the manufacturer of the product. Information obtained from the database 1180, is then incorporated into the sixth communication 1110f and the seventh communication 1110g.

As described earlier in association with FIG. 3, other embodiments of a printer can function to store a numerical code inside of media that functions as a radio frequency identification (RFID) transponder. An embodiment of such a type of specialty printer is referred to herein as a RFID capable printer and such media is referred to herein as RFID storing media. In some embodiments of a label printer, such a type of label printer is capable of storing a numerical code within a unit of such RFID media, while printing a label onto such RFID storing media.

Alternatively, in some embodiments of the barcode scanner 1046a, the barcode scanner 1046a includes a keypad and a user interface display. In this circumstance, the keypad and user interface display of the barcode scanner 1046a, each preferably function as an input and an output device respectively, for the user of the barcode scanner 1046a, and provide input and output functionality to the software application module (SAM) 128, which preferably resides and executes within the barcode scanner 1046a itself.

As referred to herein, a printing device, such as the label printing device 1046b, may or may not be designed to deposit ink onto a media. In some embodiments, a printing device, that is referred to herein as a direct thermal printer, is designed to direct heat towards heat sensitive media, causing marking (printing) of the heat sensitive media. In other embodiments, a printing device, that is referred to herein as an indirect thermal printer, is designed to employ heat to cause ink to deposit onto media and to cause printing of the media.

FIG. 12A illustrates a simplified representation of an embodiment of the invention where employees travel through a warehouse carrying Wi-Fi enabled equipment to interoperate with the system of the invention.

As shown, a first employee 1232x travels through the warehouse 1240 performing various actions. This employee carries a touchscreen tablet 1210x and a barcode scanner 1046x. Software application module 128x is installed and executing on the tablet 1210x. The tablet 1210x has a Wi-Fi communication connection to software application interface module (SAIM) 1042 via communications bridge/agent 1248, which is also referred to herein as a communications bridge 1248 and/or as a communications agent 1248. Likewise, the barcode scanner 1046x has a Wi-Fi communication connection to device specific interface module (DSIM) 1044 which as described earlier, acts as an intermediary with the software application interface module (SAIM) 1042 residing (executing) on the second computing platform 120.

The communication bridge/agent 1248 facilitates communication between different communication interfaces. Such communication interfaces can employ universal serial bus (USB), Ethernet, Bluetooth or Wi-Fi communications interfaces, just for example. A Bluetooth-Ethernet communication bridge/agent enables communication between Bluetooth devices and an Ethernet network, and vice versa. A USB-Wi-Fi communications bridge/agent enables communication between USB devices and a Wi-Fi network, and vice versa. A Bluetooth-Wi-Fi communications bridge/agent enables communication between Bluetooth devices and a Wi-Fi network, and vice versa.

The communications bridge/agent 1248, can also perform additional functionality. A device, including such as a specialty device, may not be configured to execute a discovery protocol. The communications bridge/agent 1248 can be configured to implement such device discovery protocol and provide such device discovery information as to the availability of one or more devices, including specialty devices, to other components within the system of the invention, and to such as to the SAIM 1042 and/or DSMI 1044, for example.

The communications bridge/agent 1248, can also implement one or more messaging queues per communication channel, where each communication channel represents at least a portion of a path of communication between two entities, being components/devices of the system. Such an arrangement can mitigate a noisy communications channel, such as involving a Bluetooth device, for example, by collecting and relaying multiple messages over a short period of time.

The aforementioned functionality, can mitigate circumstances where, a device, including such as a specialty device, may not be configured to implement a sufficient number of data communication retries. To address this issue, the communications bridge/agent 1248 is implemented with data communication retry functionality to provide a sufficient number of data communication retries, for such a device, to other components within the system of the invention, such as to the SAIM 1042 for example.

In yet other embodiments, the above described communications bridge/agent functionality, operates at locations other than what is shown in this FIG. 12A. For example, a communications bridge/agent 1248 can act as an intermediary between a DSIM 1044 and other devices, including specialty devices, or between a DSIM 1044 and the SAIM 1042.

In some embodiments, the above described communications bridge/agent 1248 functionality can also be configured (implemented) in partially or fully into one or more device specific interface modules (DSIM) 1044, to enhance the communications interface between a other components within the system, including between one or more devices, including specialty devices, and the SAIM 1042, for example.

The communications bridge/agent 1248 converts information communicated wirelessly from the tablet 1210$x$ and the SAM 128 into internet protocol (IP) carried information which is then communicated over a wireline connection from computer 110 to and from the second computing platform 120 and the SAIM 1042, residing thereon. Likewise, the DSIM 1044 converts information communicated wirelessly from the barcode reader 1046 into internet protocol (IP) carried information which is communicated over a wireline connection to and from the second computing platform 120 and the SAIM 1042 residing thereon.

Essentially, the entire warehouse 1240 is an enlarged Wi-Fi hotspot. The same functionality described in association with the first employee 1232$x$, also applies to a second employee 1232$y$ who is also carrying another touchscreen tablet 1210$y$ and another barcode scanner 1046$y$. There are dozens of employees equipped in the same manner as the first and second employees, that are employed to work within this warehouse 1240. The warehouse includes a large plurality of storage locations 1250, also referred to herein as storage bins 1250.

The employees each travel through the warehouse requesting and performing various actions and operations, including price lookup action, a label printing action, an inventory picking (inventory reduction/item removal) action, inventory addition (item addition), inventory update (item check/verify) action, a shipping action and a receiving action, and various inventory query requests to ascertain what items, and in what amounts, and at what locations, are currently recorded as being stored within the inventory of the system.

The first computer (computing platform) 110 is located in or nearby the warehouse 1240. However, the second computer (computing platform) 120 and the SAIM 1042 residing thereon, is located away from the warehouse 1240, and can be located far away and miles away in another building, or another town, or another state or even another country. Also, many warehouses, in addition to warehouse 1240, are in communication with the second computer (computing platform) 120 and the SAIM 1042.

In a variation of the above described embodiment of the invention, the tablet 1210$x$-1210$y$ can itself function as a Wi-Fi hotspot, and as a result, the barcode scanner 1046$x$-1046$y$ communicates directly via Wi-Fi to the tablet 1210$x$-1210$y$. In this embodiment, like the SAM 128$x$-128$y$, the DSIM 1044 can instead reside and execute on the tablet 1210$x$-1210$y$, and communicate with the SAIM 1042 via the communications agent (bridge) 1248, in the same manner as the SAM 128$x$-128$y$.

In other embodiments, such as shown in FIG. 12B, the software application module (SAM) 128 is designed to be divided into a front end (sub-module) and a back end (sub-module). The front end of the SAM 128 functions as an interface to a user (user interface), while the back end of the SAM 128 functions as an interface to an executing instance of the SAIM 1042. The front end and back end of the SAM 128, can reside (execute) on the same or on different computing platforms (computers), and can communicate with each other via a communications network.

Likewise, in other embodiments, the device specific interface module (DSIM) 1044 is designed to be divided into a front end (sub-module) and a back end (sub-module). The front end of the DSIM 1044 functions as an interface to a device (device interface), while the back end of the DSIM 1044 functions as an interface to an executing instance of the SAIM 1042. The front end and back end of the DSIM 1044, can reside (execute) on the same or on different computing platforms (computers), and can communicate with each other via a communications network.

FIG. 12 B illustrates a simplified representation of an embodiment of the invention where a mobile Wi-Fi hotspot is employed to enable mobile access to the system of the invention. As shown, a delivery truck 1230 includes a user/driver 1232, who is in possession of a mobile telephone 1206, a touch screen tablet 1210 and a barcode scanning device 1046$x$. The mobile telephone 1206 is designed to communicate with a network of cell (mobile) telephone towers via at least a portion of what is referred to herein, as a set of cellular telephone communication protocol (CTCP) standards.

The mobile Wi-Fi hotspot functions within a volume of space that is proximate to the mobile telephone 1206. This volume of space includes the interior of the delivery truck 1230 and that includes a volume of space within a vicinity surrounding the delivery truck 1230, while the mobile telephone 1206 is located in the delivery truck 1230. The mobile Wi-Fi hotspot functions whether or not the delivery truck 1230 is stationary (parked) or in motion. The vicinity surrounding the delivery truck 1230 functions to enable communication via the Wi-Fi hot spot when the delivery truck 1230 is in motion, and while the delivery truck 1230 is stationary and while the user/driver 1232 is walking with the telephone 1206 and the touch screen tablet 1210 outside of, but in proximity of the delivery truck 1230.

There CTCP standards include such as those associated with Global System for Mobile Communications (GSM), Code Division Multiple Access (CDMA) and with General Packet Radio Service (GPRS), for example.

As referred to herein, CTCP is a set of one or more communication protocol standards that are employed to communicate data to and from and between mobile (cell) telephones via a network of cell telephone towers. These protocols are classified as mobile communication protocols and can be employed to further function as a base or link layer communications protocol, to carry other types of communications protocols, such as for example, the Internet Protocol (IP) and packets including data produced, received and processed by software application programs. Such data is referred to herein as application data, content data, content or data.

Accordingly, while the mobile telephone 1206 functions as a Wi-Fi hot spot, data can be communicated between the mobile telephone 1206 and the tablet 1210 and between the mobile telephone 1206 and the barcode scanning device 1046 via Wi-Fi communications that are enabled by the mobile Wi-Fi hot spot. The Internet Protocol (IP) and data can also be communicated to and from the mobile telephone 1206 to enable data (information) communication between the mobile telephone 1206 and the software application module (SAM) 128*b* and/or the device specific interface module (DSIM) 1044*x*.

As a result, the tablet 1210 and the barcode scanning device can communicate with software application (back end) sub-module (SAM) 128*b* and/or the device specific interface module (DSIM) 1044*x*, via employment of the aforementioned communications protocols. In other words, the mobile telephone 1206, acts as a communications bridge (agent) for devices within the delivery truck 1230, being the barcode scanning device 1046*x* and the tablet 1210, and the (front end) sub-module (SAM) 128*a* that resides and executes within the tablet 1210. This communications bridge (agent) enables communication between the devices within the delivery truck 1230 and equipment outside of the delivery truck 1230. The equipment outside of the delivery truck being the back end sub-module 128*a* of the software application module (SAM) 128 and/or the device specific interface module (DSIM) 1044*x*, that is executing (residing) upon computer 110 which is not necessarily located anywhere near the vicinity of the delivery truck 1230.

The user interface portion (front end) 128*a* of the software application module (SAM) 128 resides (executes) within the tablet 1210, enabling the user 1232 to communicate requests (commands) to the software application module (SAM) 128*b*, residing (executing) on computer 110, and where such requests (commands) are further relayed to the software application interface module (SAIM) 1042, residing (executing) on computer 120, which is also not necessarily located anywhere near the vicinity of the delivery truck 1230. The above described embodiment is an example use scenario enabling the system to interoperate with mobile computing platforms and devices.

As described above, embodiments of the invention are applied to items that are stored within one or more facilities, including one or more warehouses. Activities associated with a warehouse include receiving, shipping, and inventory management and logistics. Inventory management and logistics includes item identification and tracking, status monitoring with respect to location, physical/environmental characteristics, such as temperature of an environment into which an item is stored, for example, a refrigerator, and the temperature of the item itself, if perishable food, for example. Inventory management/logistics can also involve relocation of items over time within one or more facilities, and tracking of status of items such as which items have been sold or not sold at a point in time, or set aside and not available for sale, and/or that are scheduled for shipping. Such items can include a wide array of products, including hard goods, processed food, produce, and pharmaceuticals received into, stored into, and shipped from one or more facilities.

The software modules that are described herein, such as including the software application interface module (SAIM), and/or the device specific interface module (DSIM) and/or the software application module (SAM), the instructions of which, also referred to herein as the software of which, can be stored upon and read from a tangible non-transitory computer readable medium, also referred to herein as media, including such as for example, a universal serial bus (USB) memory stick, a flash memory device, solid state disc or some other type of non-volatile storage device, whether or not that non-volatile storage device is considered portable or not portable.

The instructions of these software modules being binary executable program instructions that when executed upon one or more central processing unit (CPU) processors direct and cause the CPU processors to perform actions that contribute to coordinating operation of one of more devices. At least one of these devices can be located remotely from either or both of where the SAIM or the SAM are each located.

The SAIM can be executing on a computer that is located at the first location and communication can be established with the SAIM via transmission of a communication protocol transaction to the SAIM, where the SAIM is functioning as a node within a first network, and the SAIM can be addressed via one network address residing within that first network. For example, the network can be the Internet, and the address can be an internet address.

A device specific interface module (DSIM) can reside within the same first network as the SAIM, or not reside within that same first network. For example, the DSIM can reside within a second network other than the first network, and the SAIM can communicate with the DSIM via the second network and act as a gateway between the first and second networks. Or, DSIM can reside outside of a network, and the SAIM can communicate with the DSIM via other means of communication, being other than communication via separate nodes on one same network. For example, such other means of communication can be classified as a point to point means of communication, for example, such as a wire line point to point communication.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A tangible non-transitory computer readable medium, storing central processing unit (CPU processor) executable program instructions that when executed upon one or more CPU processors from at least one location, cause the CPU processors to perform a method for coordinating operation of devices that can be located remotely from the one location, the method including the actions of:

providing a software application interface module (SAIM) for execution on a first computing platform that is located at a first location and configured for directing operation of one of one or more devices, via communication with a plurality of one or more device specific interface modules (DSIM); and wherein said SAIM being further configured for communicating with at least one software application module (SAM) that is executing on a second computing platform that is located at a second location; said software application interface module (SAIM) providing a first application programming interface (API) that is configured for receiving a request for performance of an operation of said one of one or more devices; said request being received from said software application module (SAM), and wherein said one of one or more devices being located remotely from either or both of said first and said second locations.

2. The medium of claim 1 wherein said one of one or more devices is one of a barcode scanning device, a label printing device, a barcode printing device, a RFID reader device and an RFID encoding device.

3. The medium of claim 1 wherein said first computing platform is a mobile computing device that communicates with said SAIM via a wireless communication channel.

4. The medium of claim 3 wherein said wireless communication channel includes a Wi-Fi network and/or a cell telephone tower network.

5. The medium of claim 1 wherein said software application interface module (SAIM) coordinates inter-operation between a barcode scanning device and a label printing device.

6. The medium of claim 1 wherein said software application interface module (SAIM) performs at least one of a price lookup operation and a label printing operation.

7. The medium of claim 1 wherein said software application interface module (SAIM) performs at least one of operations of inventory verification, inventory reduction, inventory addition, inventory shipping, inventory receiving operations.

8. The medium of claim 1 wherein a communications agent is employed as a communications bridge between said SAM and said SAIM and/or between said DSIM and said SAIM.

9. A system for coordinating operation of devices that can be located remotely from one location, the system including:
a first computing platform that is located at a first location, said first computing platform including one or more central processing unit (CPU) processors, and including a memory for storing instructions for execution upon said one or more central processing unit (CPU) processors;
a software application interface module (SAIM) for execution on said first computing platform, said SAIM configured for directing operation of one of one or more devices, via communication with a plurality of one or more device specific interface modules (DSIM); and wherein
said SAIM being further configured for communicating with at least one software application module (SAM) that is executing on a second computing platform that is located at a second location; said software application interface module (SAIM) providing a first application programming interface (API) that is configured for receiving a request for performance of an operation of said one of one or more devices; said request being received from said software application module (SAM); and wherein
said memory of said first computing platform storing instructions of said software application interface module (SAIM), said instructions of said software application interface module (SAIM) causing said one or more central processing unit (CPU) processors to perform said receiving a request for performance of an operation of said one of one or more devices, and to perform said directing operation of one of one or more devices, via communication with a plurality of one or more device specific interface modules (DSIM); and wherein
said one of one or more devices being located remotely from either or both of said first and said second locations.

10. The system of claim 9 wherein said one of one or more devices is one of a barcode scanning device, a label printing device, a barcode printing device, a RFID reader device and an RFID encoding device.

11. The system of claim 9 wherein said first computing platform is a mobile computing device that communicates with said SAIM via a wireless communication channel.

12. The system of claim 11 wherein said wireless communication channel includes a Wi-Fi network and/or a cell telephone tower network.

13. The system of claim 9 wherein said software application interface module (SAIM) coordinates inter-operation between a barcode scanning device and a label printing device.

14. The system of claim 9 wherein said software application interface module (SAIM) performs at least one of a price lookup operation and a label printing operation.

15. The system of claim 9 wherein said software application interface module (SAIM) performs at least one of operations of inventory verification, inventory reduction, inventory addition, inventory shipping, inventory receiving operations.

16. The system of claim 9 wherein a communications agent is employed as a communications bridge between said SAM and said SAIM and/or between said DSIM and said SAIM.

17. A method for coordinating operation of devices that can be located remotely from the one location, the method including the steps of:
providing a software application interface module (SAIM) for execution on a first computing platform that is located at a first location and configured for directing operation of one of one or more devices, via communication with a plurality of one or more device specific interface modules (DSIM); and wherein
said SAIM being further configured for communicating with at least one software application module (SAM) that is executing on a second computing platform that is located at a second location; said software application interface module (SAIM) providing a first application programming interface (API) that is configured for receiving a request for performance of an operation of said one of one or more devices; said request being received from said software application module (SAM); and wherein
said one of one or more devices being located remotely from either or both of said first and said second locations.

18. The method of claim 17 wherein said one of one or more devices is one of a barcode scanning device, a label printing device, a barcode printing device, a RFID reader device and an RFID encoding device.

19. The method of claim 17 wherein said software application interface module (SAIM) coordinates inter-operation between a barcode scanning device and a label printing device.

20. The method of claim 17 wherein said software application interface module (SAIM) performs at least one of a price lookup operation and a label printing operation.

\* \* \* \* \*